(12) United States Patent
Oguchi

(10) Patent No.: US 8,761,173 B2
(45) Date of Patent: Jun. 24, 2014

(54) NETWORK CONFIGURING METHOD, NETWORK SYSTEM AND RELAY APPARATUS

(75) Inventor: Naoki Oguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 974 days.

(21) Appl. No.: 11/937,028

(22) Filed: Nov. 8, 2007

(65) Prior Publication Data
US 2008/0107126 A1 May 8, 2008

(30) Foreign Application Priority Data

Nov. 7, 2006 (JP) ................................. 2006-301983

(51) Int. Cl.
*H04L 12/28* (2006.01)
*H04L 12/56* (2006.01)
*H04J 3/16* (2006.01)
*H04J 3/22* (2006.01)
*H04J 3/24* (2006.01)
*H04L 12/54* (2013.01)
*H04L 12/46* (2006.01)

(52) U.S. Cl.
CPC ............ *H04L 45/50* (2013.01); *H04L 12/5689* (2013.01); *H04L 12/4641* (2013.01)
USPC .......................................... 370/392; 370/469

(58) Field of Classification Search
None
See application file for complete search history.

(56) References Cited

U.S. PATENT DOCUMENTS

| 5,699,350 | A  | * | 12/1997 | Kraslavsky ................... 370/254 |
| 2001/0050914 | A1 | * | 12/2001 | Akahane et al. .............. 370/382 |
| 2003/0137974 | A1 | * | 7/2003 | Kwan et al. ................... 370/352 |
| 2007/0258382 | A1 | * | 11/2007 | Foll et al. ...................... 370/252 |

FOREIGN PATENT DOCUMENTS

JP 7-327050 12/1995

* cited by examiner

*Primary Examiner* — John Blanton
*Assistant Examiner* — Christopher Crutchfield
(74) *Attorney, Agent, or Firm* — Fujitsu Patent Center

(57) ABSTRACT

A relay apparatus for performing relay possessing is disclosed. The relay apparatus includes a first logical relay unit; a second logical relay unit; a sending unit configured to add a packet header including a first protocol identifier or a second protocol identifier registered in a protocol assignment unit to a packet to be sent by the first logical relay unit or the second logical relay unit, and to send the packet to a network; a receiving unit configured to pass a received packet to the first logical relay unit or the second logical relay unit by referring to the protocol assignment unit based on a protocol identifier in a packet header of the received packet; and a switching process unit configured to change correspondence relationship for the first and the second protocol identifiers to switch between the first logical relay unit and the second logical relay unit.

4 Claims, 37 Drawing Sheets

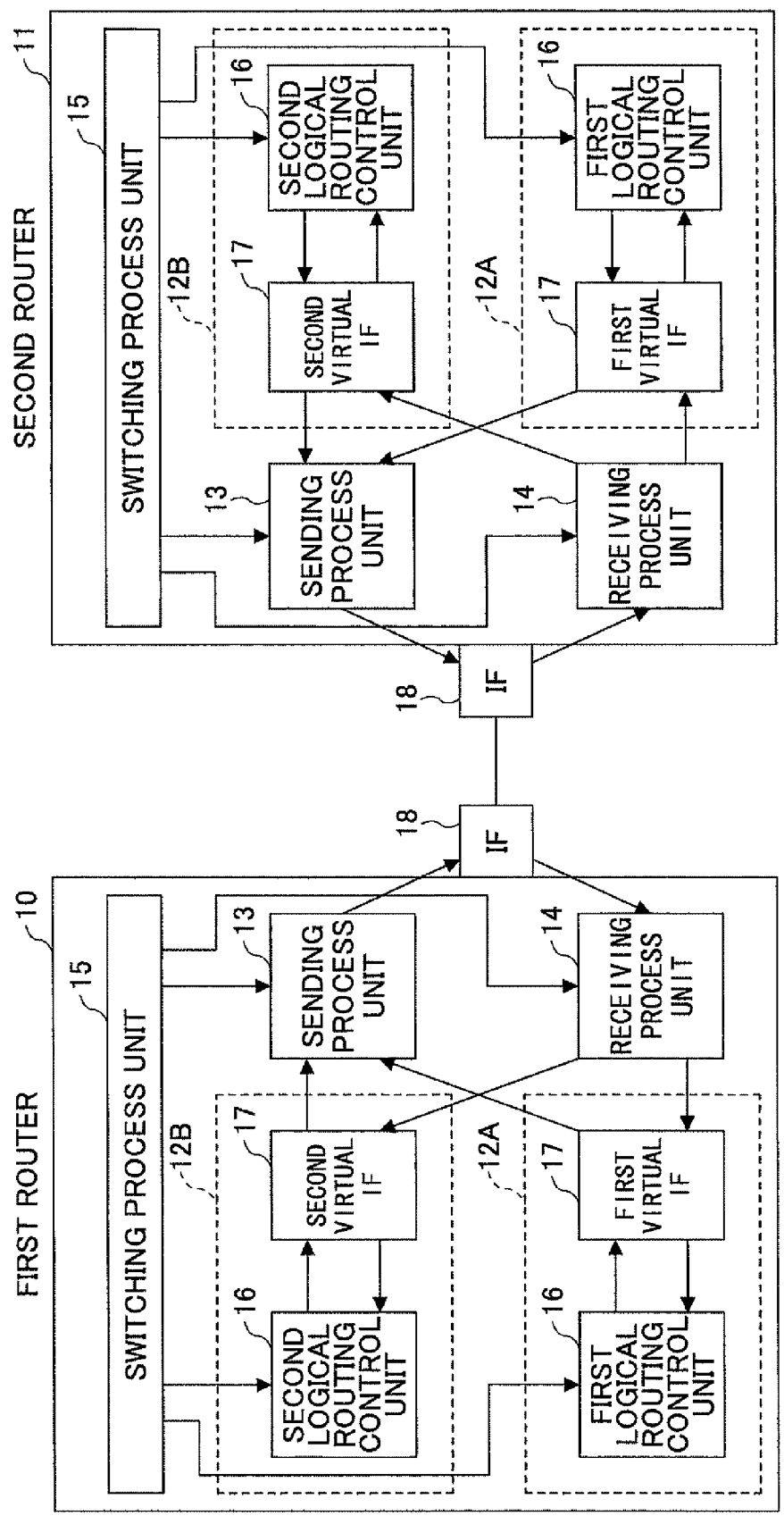

CHANGED NETWORK CONFIGURATION

CURRENT NETWORK CONFIGURATION

FIG.6

| LOGICAL ROUTER IDENTIFIER | PROTOCOL TYPE VALUE |
|---|---|
| A | 0x800 |
| B | 0x7FF |

FIG.7

```
1:interface ethernet 0
2: ip address 10.25.151.1
3:!
4:interface ethernet 1
5: ip address 10.25.153.1
6:!
7:interface ethernet 3
8: ip address 10.25.161.1
9:!
10:router rip
11:network 10.25.161.0
```

FIG.8

| IF NAME | SETTING | VALUE |
|---|---|---|
| Ethernet0 | IP ADDRESS | 10.25.151.1 |
| | NET MASK | 255.255.255.0 |
| | BROADCAST ADDRESS | 10.25.151.255 |
| Ethernet1 | IP ADDRESS | 10.25.153.1 |
| | NET MASK | 255.255.255.0 |
| | BROADCAST ADDRESS | 10.25.153.255 |
| Ethernet3 | IP ADDRESS | 10.25.161.1 |
| | NET MASK | 255.255.255.0 |
| | BROADCAST ADDRESS | 10.25.161.255 |

FIG.9

```
1:interface ethernet 0
2: ip address 10.25.151.2
3:!
4:interface ethernet 1
5: ip address 10.25.152.1
6:!
7:interface ethernet 3
8: ip address 10.25.162.1
9:!
10:router rip
11:network 10.25.162.0
```

FIG.10

| IF NAME | SETTING | VALUE |
|---|---|---|
| Ethernet0 | IP ADDRESS | 10.25.151.2 |
| | NET MASK | 255.255.255.0 |
| | BROADCAST ADDRESS | 10.25.151.255 |
| Ethernet1 | IP ADDRESS | 10.25.152.1 |
| | NET MASK | 255.255.255.0 |
| | BROADCAST ADDRESS | 10.25.152.255 |
| Ethernet3 | IP ADDRESS | 10.25.162.1 |
| | NET MASK | 255.255.255.0 |
| | BROADCAST ADDRESS | 10.25.162.255 |

FIG.11

```
1:interface ethernet 0
2: ip address 10.25.152.2
3:!
4:interface ethernet 1
5: ip address 10.25.153.2
6:!
7:interface ethernet 3
8: ip address 10.25.163.1
9:!
10:router rip
11:network 10.25.163.0
```

FIG.12

| IF NAME | SETTING | VALUE |
|---|---|---|
| Ethernet0 | IP ADDRESS | 10.25.152.2 |
| | NET MASK | 255.255.255.0 |
| | BROADCAST ADDRESS | 10.25.152.255 |
| Ethernet1 | IP ADDRESS | 10.25.153.2 |
| | NET MASK | 255.255.255.0 |
| | BROADCAST ADDRESS | 10.25.153.255 |
| Ethernet3 | IP ADDRESS | 10.25.163.1 |
| | NET MASK | 255.255.255.0 |
| | BROADCAST ADDRESS | 10.25.163.255 |

FIG.15

| DESTINATION ADDRESS | NEXT HOP ROUTER | OUTPUT IF |
|---|---|---|
| 10.25.163.0/24 | 10.25.153.2 | IF1 |
| 10.25.162.0/24 | 10.25.151.2 | IF0 |
| 10.25.161.0/24 | 10.25.161.1 | IF3 |
| 10.25.153.0/24 | 10.25.153.1 | IF1 |
| 10.25.151.0/24 | 10.25.151.1 | IF0 |

FIG.16

| DESTINATION ADDRESS | NEXT HOP ROUTER | OUTPUT IF |
|---|---|---|
| 10.25.163.0/24 | 10.25.152.2 | IF1 |
| 10.25.161.0/24 | 10.25.151.1 | IF0 |
| 10.25.162.0/24 | 10.25.162.1 | IF3 |
| 10.25.152.0/24 | 10.25.152.1 | IF1 |
| 10.25.151.0/24 | 10.25.151.2 | IF0 |

FIG.17

| DESTINATION ADDRESS | NEXT HOP ROUTER | OUTPUT IF |
|---|---|---|
| 10.25.161.0/24 | 10.25.153.1 | IF1 |
| 10.25.162.0/24 | 10.25.151.1 | IF0 |
| 10.25.163.0/24 | 10.25.163.1 | IF3 |
| 10.25.153.0/24 | 10.25.153.2 | IF1 |
| 10.25.152.0/24 | 10.25.152.2 | IF0 |

FIG.19

```
1:interface IF0
2: ip address 10.25.151.1
3:!
4:interface IF1
5: ip address 10.25.153.1
6:!
7:interface IF2
8: ip address 10.25.153.1
9:!
10:interface IF3
11: ip address 10.25.161.1
12:!
13:router rip
14:network 10.25.161.0
12:offset-list 0 out 3 IF2
13:offset-list 0 in 3 IF2
```

FIG.20

| IF NAME | SETTING | VALUE |
|---|---|---|
| IF0 | IP ADDRESS | 10.25.151.1 |
| | NET MASK | 255.255.255.0 |
| | BROADCAST ADDRESS | 10.25.151.255 |
| IF1 | IP ADDRESS | 10.25.153.1 |
| | NET MASK | 255.255.255.0 |
| | BROADCAST ADDRESS | 10.25.153.255 |
| IF2 | IP ADDRESS | 10.25.155.1 |
| | NET MASK | 255.255.255.0 |
| | BROADCAST ADDRESS | 10.25.155.255 |
| IF3 | IP ADDRESS | 10.25.161.1 |
| | NET MASK | 255.255.255.0 |
| | BROADCAST ADDRESS | 10.25.161.255 |

FIG.21

```
1:interface IF0
2: ip address 10.25.151.2
3:!
4:interface IF1
5: ip address 10.25.152.1
6:!
7:interface IF3
8: ip address 10.25.162.1
9:!
10:router rip
11:network 10.25.162.0
```

FIG.22

| IF NAME | SETTING | VALUE |
|---|---|---|
| IF0 | IP ADDRESS | 10.25.151.2 |
|  | NET MASK | 255.255.255.0 |
|  | BROADCAST ADDRESS | 10.25.151.255 |
| IF1 | IP ADDRESS | 10.25.152.1 |
|  | NET MASK | 255.255.255.0 |
|  | BROADCAST ADDRESS | 10.25.152.255 |
| IF3 | IP ADDRESS | 10.25.162.1 |
|  | NET MASK | 255.255.255.0 |
|  | BROADCAST ADDRESS | 10.25.162.255 |

FIG.23

```
1:interface IF0
2: ip address 10.25.152.2
3:!
4:interface IF1
5: ip address 10.25.153.2
6:!
7:interface IF2
8: ip address 10.25.154.2
9:!
10:interface IF3
11: ip address 10.25.163.1
12:!
13:router rip
14:network 10.25.163.0
```

FIG.24

| IF NAME | SETTING | VALUE |
|---|---|---|
| IF0 | IP ADDRESS | 10.25.152.2 |
| | NET MASK | 255.255.255.0 |
| | BROADCAST ADDRESS | 10.25.152.255 |
| IF1 | IP ADDRESS | 10.25.153.2 |
| | NET MASK | 255.255.255.0 |
| | BROADCAST ADDRESS | 10.25.153.255 |
| IF2 | IP ADDRESS | 10.25.154.2 |
| | NET MASK | 255.255.255.0 |
| | BROADCAST ADDRESS | 10.25.154.255 |
| IF3 | IP ADDRESS | 10.25.163.1 |
| | NET MASK | 255.255.255.0 |
| | BROADCAST ADDRESS | 10.25.163.255 |

FIG.25

```
1:interface  IF0
2: ip address 10.25.155.2
3:!
4:interface IF1
5: ip address 10.25.154.1
6:!
7:interface IF3
8: ip address 10.25.164.1
9:!
10:router rip
11:network 10.25.164.0
12:offset-list 0 out 3 IF0
13:offset-list 0 in 3 IF0
```

FIG.26

| IF NAME | SETTING | VALUE |
| --- | --- | --- |
| IF0 | IP ADDRESS | 10.25.155.2 |
| | NET MASK | 255.255.255.0 |
| | BROADCAST ADDRESS | 10.25.155.255 |
| IF1 | IP ADDRESS | 10.25.154.1 |
| | NET MASK | 255.255.255.0 |
| | BROADCAST ADDRESS | 10.25.154.255 |
| IF3 | IP ADDRESS | 10.25.164.1 |
| | NET MASK | 255.255.255.0 |
| | BROADCAST ADDRESS | 10.25.164.255 |

FIG.28

| DESTINATION ADDRESS | NEXT HOP ROUTER | OUTPUT IF | LINE NUMBER |
|---|---|---|---|
| 10.25.164.0/24 | 10.25.153.2 | IF1 | 1 |
| 10.25.163.0/24 | 10.25.153.2 | IF1 | 2 |
| 10.25.162.0/24 | 10.25.151.2 | IF0 | 3 |
| 10.25.161.0/24 | 10.25.161.1 | IF3 | 4 |
| 10.25.155.0/24 | 10.25.155.1 | IF2 | 5 |
| 10.25.153.0/24 | 10.25.153.1 | IF1 | 6 |
| 10.25.151.0/24 | 10.25.151.1 | IF0 | 7 |

FIG.29

| DESTINATION ADDRESS | NEXT HOP ROUTER | OUTPUT IF | LINE NUMBER |
|---|---|---|---|
| 10.25.164.0/24 | 10.25.152.2 | IF1 | 1 |
| 10.25.163.0/24 | 10.25.152.2 | IF1 | 2 |
| 10.25.161.0/24 | 10.25.151.1 | IF0 | 3 |
| 10.25.162.0/24 | 10.25.162.1 | IF3 | 4 |
| 10.25.152.0/24 | 10.25.152.1 | IF1 | 5 |
| 10.25.151.0/24 | 10.25.151.2 | IF0 | 6 |

FIG.30

| DESTINATION ADDRESS | NEXT HOP ROUTER | OUTPUT IF | LINE NUMBER |
|---|---|---|---|
| 10.25.164.0/24 | 10.25.154.1 | IF2 | 1 |
| 10.25.161.0/24 | 10.25.153.1 | IF1 | 2 |
| 10.25.162.0/24 | 10.25.151.1 | IF0 | 3 |
| 10.25.163.0/24 | 10.25.163.1 | IF3 | 4 |
| 10.25.154.0/24 | 10.25.154.2 | IF2 | 5 |
| 10.25.153.0/24 | 10.25.153.2 | IF1 | 6 |
| 10.25.152.0/24 | 10.25.152.2 | IF0 | 7 |

FIG.31

| DESTINATION ADDRESS | NEXT HOP ROUTER | OUTPUT IF | LINE NUMBER |
|---|---|---|---|
| 10.25.161.0/24 | 10.25.154.2 | IF1 | 1 |
| 10.25.162.0/24 | 10.25.154.2 | IF1 | 2 |
| 10.25.163.0/24 | 10.25.154.2 | IF1 | 3 |
| 10.25.164.0/24 | 10.25.164.1 | IF3 | 4 |
| 10.25.154.0/24 | 10.25.154.1 | IF1 | 5 |
| 10.25.155.0/24 | 10.25.155.2 | IF0 | 6 |

FIG.36

| FIELD NAME | VALUE | MEANING |
|---|---|---|
| IDENTIFIER 1 | A | LOGICAL ROUTER A |
| COMMAND | "—" | DELETION |
| PROTOCOL TYPE | 0x0 | UNDEFINED |
| IDENTIFIER 2 | B | LOGICAL ROUTER B |
| COMMAND | M | MODIFY |
| PROTOCOL TYPE | 0x800 | NEW PROTOCOL TYPE VALUE |
| Action Time | 2006/05/31 24:00 | TIME FOR SWITCHING |

FIG.38

| LOGICAL ROUTER IDENTIFIER | PROTOCOL VALUE | PACKET FORMAT |
|---|---|---|
| A | ^254 (OTHER THAN 254) | MAC+IP |
| B | 254 | MAC+IP+IP |

FIG.40

```
1:interface IF0
2: ip address 10.25.151.1
3:!
4:interface IF1
5: ip address 10.25.153.1
6:!
10:interface IF3
11: ip address 10.25.161.1
12:!
13:router rip
14:network 10.25.161.0
12:offset-list 0 out 3 IF2
13:offset-list 0 in 3 IF2
```

FIG.41

| IF NAME | SETTING | VALUE |
| --- | --- | --- |
| IF0 | IP ADDRESS | 10.25.151.1 |
| | NET MASK | 255.255.255.0 |
| | BROADCAST ADDRESS | 10.25.151.255 |
| IF1 | IP ADDRESS | 10.25.153.1 |
| | NET MASK | 255.255.255.0 |
| | BROADCAST ADDRESS | 10.25.153.255 |
| IF3 | IP ADDRESS | 10.25.161.1 |
| | NET MASK | 255.255.255.0 |
| | BROADCAST ADDRESS | 10.25.161.255 |

FIG.42

```
1:interface IF0
2: ip address 10.25.151.2
3:!
7:interface IF3
8: ip address 10.25.162.1
9:!
10:router rip
11:network 10.25.162.0
```

FIG.43

| IF NAME | SETTING | VALUE |
|---------|---------|-------|
|         | IP ADDRESS | 10.25.151.2 |
| IF0     | NET MASK | 255.255.255.0 |
|         | BROADCAST ADDRESS | 10.25.151.255 |
|         | IP ADDRESS | 10.25.162.1 |
| IF3     | NET MASK | 255.255.255.0 |
|         | BROADCAST ADDRESS | 10.25.162.255 |

FIG.44

```
4:interface IF1
5: ip address 10.25.153.2
6:!
10:interface IF3
11: ip address 10.25.163.1
12:!
13:router rip
14:network 10.25.163.0
```

FIG.45

| IF NAME | SETTING | VALUE |
|---|---|---|
| IF1 | IP ADDRESS | 10.25.153.2 |
| | NET MASK | 255.255.255.0 |
| | BROADCAST ADDRESS | 10.25.153.255 |
| IF3 | IP ADDRESS | 10.25.163.1 |
| | NET MASK | 255.255.255.0 |
| | BROADCAST ADDRESS | 10.25.163.255 |

FIG.47

| DESTINATION ADDRESS | NEXT HOP ROUTER | OUTPUT IF | LINE NUMBER |
|---|---|---|---|
| 10.25.163.0/24 | 10.25.153.2 | IF1 | 1 |
| 10.25.162.0/24 | 10.25.151.2 | IF0 | 2 |
| 10.25.161.0/24 | 10.25.161.1 | IF3 | 3 |
| 10.25.153.0/24 | 10.25.153.1 | IF1 | 4 |
| 10.25.151.0/24 | 10.25.151.1 | IF0 | 5 |

FIG.48

| DESTINATION ADDRESS | NEXT HOP ROUTER | OUTPUT IF | LINE NUMBER |
|---|---|---|---|
| 10.25.163.0/24 | 10.25.151.1 | IF0 | 1 |
| 10.25.161.0/24 | 10.25.151.1 | IF0 | 2 |
| 10.25.162.0/24 | 10.25.162.1 | IF3 | 3 |
| 10.25.153.0/24 | 10.25.151.1 | IF0 | 4 |
| 10.25.151.0/24 | 10.25.151.2 | IF0 | 5 |

FIG.49

| DESTINATION ADDRESS | NEXT HOP ROUTER | OUTPUT IF | LINE NUMBER |
|---|---|---|---|
| 10.25.161.0/24 | 10.25.153.1 | IF1 | 1 |
| 10.25.162.0/24 | 10.25.153.1 | IF1 | 2 |
| 10.25.163.0/24 | 10.25.163.1 | IF3 | 3 |
| 10.25.153.0/24 | 10.25.153.2 | IF1 | 4 |
| 10.25.151.0/24 | 10.25.153.1 | IF1 | 5 |

FIG.50

| FIELD NAME | VALUE | MEANING |
|---|---|---|
| IDENTIFIER 1 | A | LOGICAL ROUTER A |
| COMMAND | "—" | DELETION |
| PROTOCOL TYPE | 0x0 | UNDEFINED |
| IDENTIFIER 2 | B | LOGICAL ROUTER B |
| COMMAND | M | MODIFY |
| PROTOCOL TYPE | ^254 | NEW PROTOCOL TYPE VALUE |
| MESSAGE FORMAT | MAC+IP+IP | |
| Action Time | 2006/05/31 24:00 | TIME FOR SWITCHING |

NETWORK CONFIGURING METHOD, NETWORK SYSTEM AND RELAY APPARATUS

BACKGROUND OF THE INVENTION

1. Field of the Invention

The present invention relates to a network configuring method, a network system and a relay apparatus.

2. Description of the Related Art

Today, service provider networks and intra-company networks are required to continue operation for 24-hours in 365 days a year. However, in these networks, configuration change for relay apparatuses often occurs due to change of operation policy of the networks, addition of new subnetworks and the like.

If network service must be stopped until finishing verification of new configuration, complicated configuration change may make service downtime become long. In order to decrease such a state in which users cannot perform network communication as much as possible, a mechanism is necessary for updating network configuration while minimizing system downtime.

For minimizing the system downtime, like a network system shown in FIG. 1, redundancy is introduced by providing a current system and a standby system. In the network system, operation in new configuration is checked in the standby system that is formed as a route of routers X, B3, B4, B1 and Y, other than a router B2. Then, after the operation is verified, operation is switched from the current system formed as a route of routers X, A3, A2, A1, and Y, other than a router A4, to the standby system.

By the way, the following patent document 1 discloses a technique for checking consistency of routing data. In the technique, each station forming a network is provided with a routing data area for active operation and a new routing data area. When changing routing data in a station, new routing data is written into the new routing area of the station. At the same time, a command is sent to a routing target station based on the new routing data for checking consistency of the routing data.

[Patent Document 1] Japanese Laid-Open Patent Application No. 7-327050

SUMMARY OF THE INVENTION

Problem to be Solved by the Present Invention

However, in the method for introducing redundancy by providing a current system and a standby system that are physically independent, there is a problem in that cost is increased since relay apparatuses are prepared for each network.

The present invention is contrived in view of the above-mentioned points, and an object of the present invention is to provide a network configuring method, a network system and a relay apparatus, that can be realized with a low cost, by which system downtime due to configuration change of a network can be minimized.

Means for Solving the Problem

According to an embodiment of the present invention, a relay apparatus for performing relay processing on a packet received from a network to send the packet to the network is provided. The relay apparatus includes:

a first logical relay unit configured to perform relay processing based on a first routing table;

a second logical relay unit configured to perform relay processing based on a second routing table;

a protocol assignment unit configured to register a first protocol identifier corresponding to the first logical relay unit and a second protocol identifier corresponding to the second logical relay unit;

a sending unit configured to add a packet header including the first protocol identifier or the second protocol identifier to a packet to be sent by the first logical relay unit or the second logical relay unit, and to send the packet to which the packet header is added to the network;

a receiving unit configured to pass a received packet to the first logical relay unit or the second logical relay unit by referring to the protocol assignment unit based on a protocol identifier in a packet header of the received packet; and a switching process unit configured to change correspondence relationship for the first and the second protocol identifiers to switch between the first logical relay unit and the second logical relay unit.

Effect of the Invention

According to the embodiment of the present invention, system downtime due to configuration change of a network or relay apparatuses can be minimized, and a redundant network system can be realized with a low cost.

BRIEF DESCRIPTION OF THE DRAWINGS

Other objects, features and advantages of the present invention will become more apparent from the following detailed description when read in conjunction with the accompanying drawings, in which:

FIG. 2 is a diagram showing an outline of the relay apparatus according to an embodiment of the present invention;

FIG. 6 is a diagram showing a protocol assignment table;

FIG. 7 is a diagram indicating configuration information of a logical router 22A of a router R1;

FIG. 8 is a diagram showing an IF-DB of the logical router 22A of the router R1;

FIG. 9 is a diagram indicating configuration information of the logical router 22A of a router R2;

FIG. 10 is a diagram showing an IF-DB of the logical router 22A of the router R2;

FIG. 11 is a diagram showing configuration information of the logical router 22A of a router R3;

FIG. 12 is a diagram showing an IF-DB of the logical router 22A of the router R3;

FIG. 15 is a diagram showing a routing table of the router R1;

FIG. 16 is a diagram showing a routing table of the router R2;

FIG. 17 is a diagram showing a routing table of the router R3;

FIG. 19 is a diagram showing configuration information of a logical router 22B of the router R1;

FIG. 20 is a diagram showing an IF-DB of the logical router 22B of the router R1;

FIG. 21 is a diagram showing configuration information of the logical router 22B of the router R2;

FIG. 22 is a diagram showing an IF-DB of the logical router 22B of the router R2;

FIG. 23 is a diagram showing configuration information of the logical router 22B of the router R3;

FIG. 24 is a diagram showing an IF-DB of the logical router 22B of the router R3;

FIG. 25 is a diagram showing configuration information of the logical router 22B of a router R4;

FIG. 26 is a diagram showing an IF-DB of the logical router 22B of the router R4;

FIG. 28 is a diagram showing a routing table of the router R1;

FIG. 29 is a diagram showing a routing table of the router R2;

FIG. 30 is a diagram showing a routing table of the router R3;

FIG. 31 is a diagram showing a routing table of the router R4;

FIG. 36 is a diagram showing a format of a protocol switching message;

FIG. 38 is a diagram showing a protocol assignment table;

FIG. 40 is a diagram showing configuration information of the logical router 22B of the router R1;

FIG. 41 is a diagram showing an IF-DB of the logical router 22B of the router R1;

FIG. 42 is a diagram showing configuration information of the logical router 22B of the router R2;

FIG. 43 is a diagram showing an IF-DB of the logical router 22B of the router R2;

FIG. 44 is a diagram showing configuration information of the logical router 22B of the router R3;

FIG. 45 is a diagram showing an IF-DB of the logical router 22B of the router R3;

FIG. 47 is a diagram showing a routing table of the router R1;

FIG. 48 is a diagram showing a routing table of the router R2;

FIG. 49 is a diagram showing a routing table of the router R3;

FIG. 50 is a diagram showing a format of a protocol switching message.

DETAILED DESCRIPTION OF THE PREFERRED EMBODIMENTS

Figure 1:
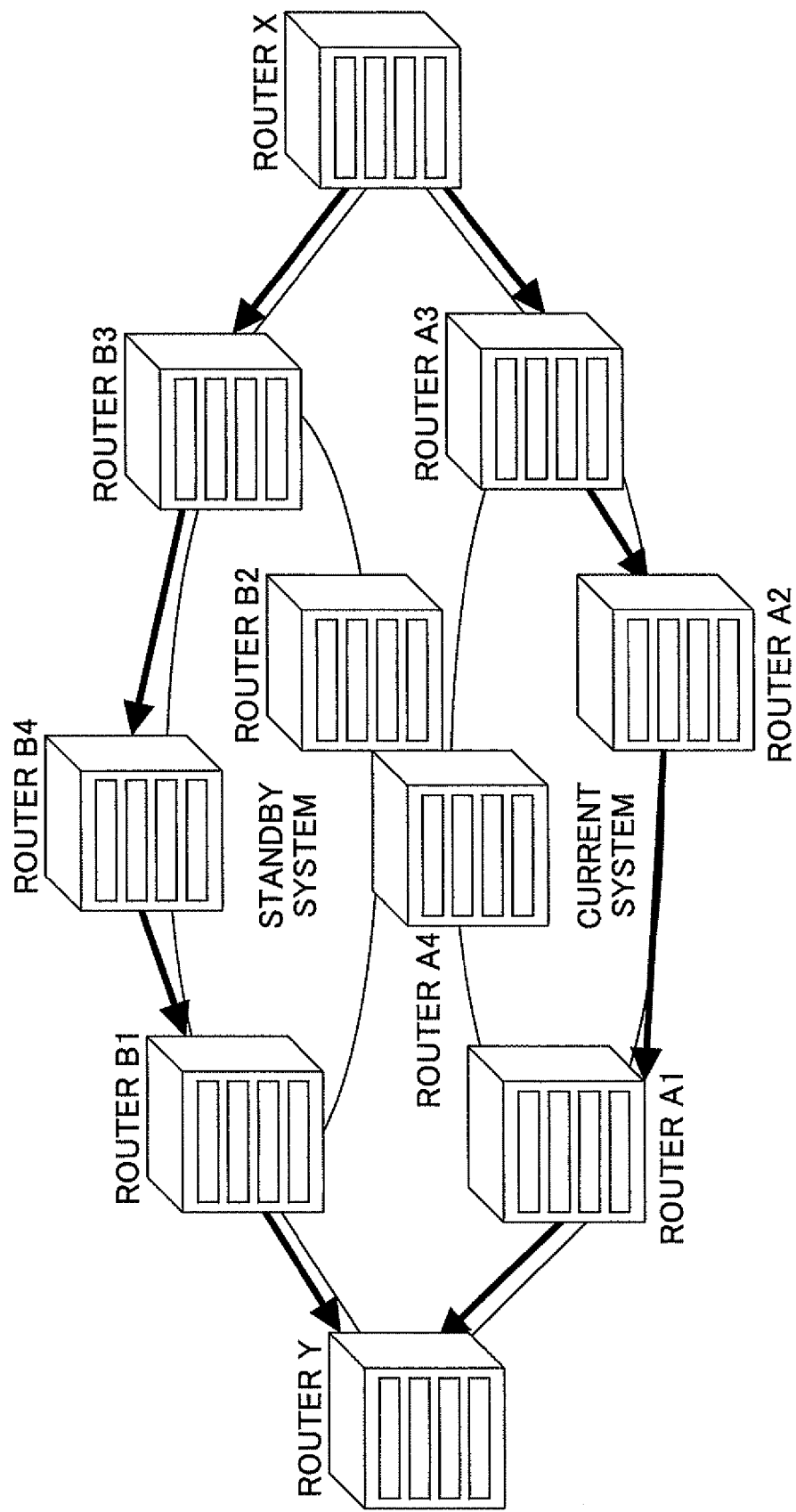
FIG. 1 is a block diagram showing a conventional network system.

In the following, embodiments of the present invention are described with reference to figures.

<Outline of the Embodiment of the Present Invention>

A virtual network based on a new setting is overlaid on a network (native network) that is currently servicing. The new setting is verified, and after operation based on the new setting is verified, the networks are switched.

As shown in FIG. 2, each of relay apparatuses (routers) 10 and 11 includes a first logical router 12A, a second logical router 12B, a sending process unit 13, a receiving process unit 14, and switching process unit 15.

Each of the logical routers 12A and 12B includes a logical routing control unit 16, and a virtual IF (interface) 17. The first logical router of the first relay apparatus 10 exchanges routing information with the first logical router 12A of the second relay apparatus 11 on the network to manage a current packet relaying route of a network layer. The second logical router 12B of the first relay apparatus 10 exchanges routing information with the second logical router 12B of the second relay apparatus 11 based on a new route.

The sending process unit 13 sends a packet, to an actual IF 18, that is sent to the virtual IF 17 by the logical router 12A, 12B. The receiving process unit 14 distributes the packet received by the actual IF 18 to the logical routers 12A and 12B. The switching process unit 15 switches between the first logical router 12A and the second logical router 12B based on a command by a manager.

<Presupposed Operation>

The network manager makes settings for current operation on the first logical router 12A of the first relay apparatus 10 in a managed network. Each of the relay apparatuses 10 and 11 performs relay processing on data packets carried by a first communication protocol.

<When Changing Network Configuration>

When it is necessary to change a network configuration, the network manager makes settings for a new network configuration on the second logical router 12B. Each of the relay apparatuses 10 and 11 performs relay processing on data packets carried by the second communication protocol in addition to data packets carried by the first communication protocol.

<Packet Transmission>

The sending process unit 13 adds a packet header of the first protocol to a packet sent by the first logical router 12A, and sends the packet to which the packet header is added. On the other hand, the sending process unit 13 adds a header of the second protocol to a packet sent by the second logical router 12B, and sends the packet to which the packet header is added.

<Receiving Packet>

When the receiving process unit 14 receives a packet including the packet header of the first protocol and when the packet is addressed to the own apparatus, the receiving process unit 14 sends the packet to the virtual IF 17 of the first logical router 12A corresponding to the actual IF 18 that received the packet. When the packet is not addressed to the own apparatus, the receiving process unit 14 searches an inside routing table to transfer the packet to a next hop relay apparatus.

When the receiving process unit 14 receives a packet including the packet header of the second protocol and when the packet is addressed to the own apparatus, the receiving process unit 14 sends the packet to the virtual IF 17 of the second logical router 12B corresponding to the actual IF 18 that received the packet. When the packet is not addressed to the own apparatus, the receiving process unit 14 searches an inside routing table to transfer the packet to a next hop relay apparatus.

<Switching of Setting>

The manager observes status information of the second logical router 12B and observes packet transfer based on the second protocol. When the manager verifies that packets are relayed as expected, the manager instructs the switching process unit 15 to switch configuration.

The switching process unit 15 stops operation of the first logical router 12A. In addition to that, the switching process unit 15 sends an instruction to the sending process unit 13 to add a header according to the first protocol to a packet sent by the second logical router 12B. In addition, the switching process unit 15 also sends an instruction to the receiving process unit 14 such that, when the receiving process unit 14 receives a packet having the packet header of the first protocol and when the packet is addressed to the own apparatus, the receiving process unit 14 sends the packet to the logical IF 17 of the second logical router 12B corresponding to the actual IF 18 that received the packet, and that, when the packet is not addressed to the own apparatus, the receiving process unit 14 searches the inside routing table to send the packet to a next hop relay apparatus.

According to an embodiment of the present invention, a network of a new configuration of relay apparatuses is overlaid on the current network. Then, after the configuration is verified, the current system and the new configuration are switched. As a result, the switching can be realized with lower cost compared to the conventional technology while minimizing downtime of the system.

<First Embodiment>

Figure 3B:
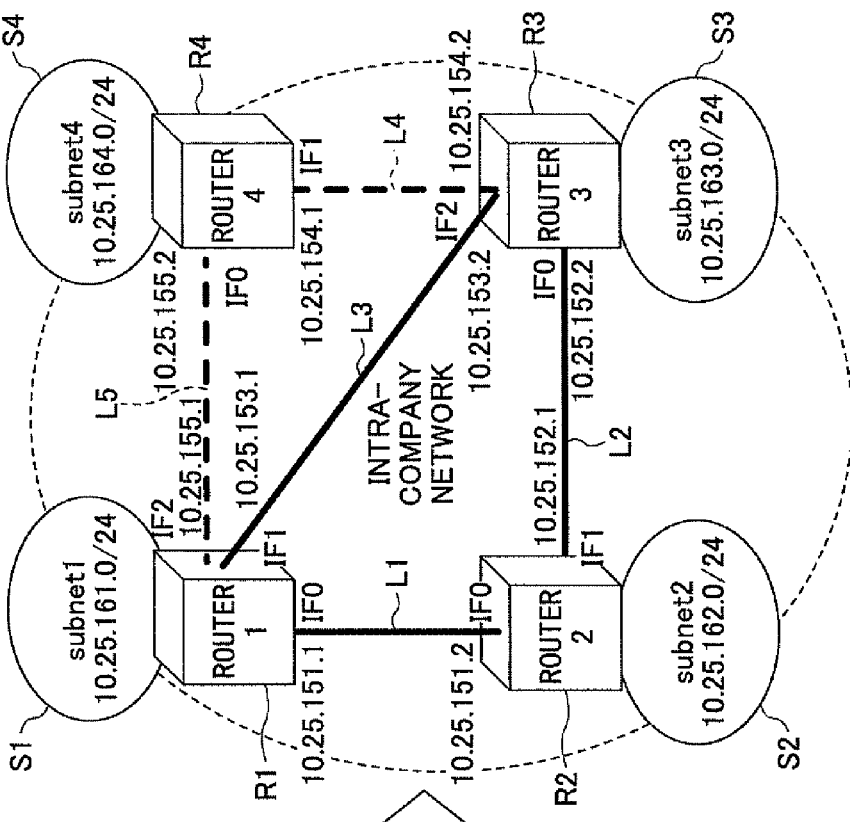
FIGS. 3A and 3B are diagrams showing network configurations for explaining an embodiment of the present invention.
Figure 3A:
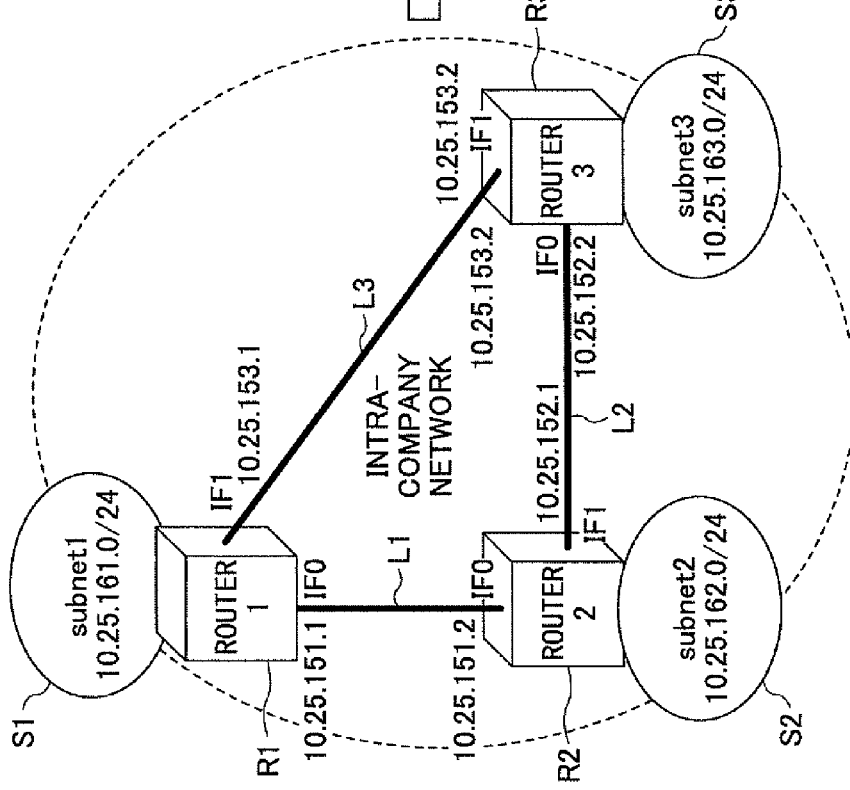

FIG. 3A shows a block diagram of a current network according to the first embodiment of the present invention. FIG. 3B is a block diagram of a network to be realized by changing the network shown in FIG. 3A.

FIG. 3A shows an intra-company network for example. The network includes three routers R1, R2 and R3 having subnetworks S1, S2 and S3 respectively under the routers. The router R1 has a subnetwork S1 to which a network address 10.25.161.0/24 is assigned.

The router R2 has a subnetwork S2 to which a network address 10.25.162.0/24 is assigned. In the same way, the router R3 has a subnetwork S3 to which a network address 10.25.163.0/24 is assigned. The routers are interconnected by links L1-L3 that are gigabit Ethernet links.

The router R1 and the router R2 are interconnected by the link L1 to which a network address 10.25.151.0/24 is assigned, and an address 10.25.151.1 is assigned to an interface IF0 of the router R1. An address 10.25.151.2 is assigned to an interface IF0 of the router R2 for accommodating the link L1.

The router R2 and the router R3 are interconnected by the link L2 to which a network address 10.25.152.0/24 is assigned, and an address 10.25.152.1 is assigned to an interface IF1 of the router R2. An address 10.25.152.2 is assigned to an interface IF0 of the router R3 for accommodating the link L2.

The router R1 and the router R3 are interconnected by the link L3 to which a network address 10.25.153.0/24 is assigned, and an address 10.25.153.1 is assigned to an interface IF1 of the router R1. An address 10.25.153.2 is assigned to an interface IF1 of the router R3 for accommodating the link L3.

Each router exchanges routing information with other routers using RIP (Routing Information Protocol).

In the following, as shown in FIG. 3B, it is assumed that a router R4 and a subnetwork S4 are added to the network along with establishment of a new department in an organization, for example. The router R4 connects to the routers R1 and R3 via links L5 and L4 respectively, in which the link L5 is different from other links, and is a fast Ethernet link and the line speed is 100 MBps.

The network address of the link L4 is 10.25.154.0/24, and an interface IF2 in the side of the router R3 has an address 10.25.154.2, and an interface IF1 in the side of the router R4 has an address 10.25.154.1.

The network address of the link L5 is 10.25.155.0/24, and an interface IF2 in the side of the router R1 has an address 10.25.155.1, and an interface IF0 in the side of the router R4 has an address 10.25.155.2.

Each router exchanges routing information with other routers using RIP.

In order to change configurations of routers to change the existing network configuration to a new network configuration, it is necessary to change configurations of at least routers R1, R3 and R4. Especially, since it is desired to use the link L4 preferentially instead of the link L5 for communications with the subnetwork S4, it is necessary to check whether packets actually passes through the link as expected when updating the router configurations.

However, for checking such operation of the updated network, it is necessary to stop relaying of the current network, change configurations, and check whether packets flow as expected. Thus, there occurs time during which the network cannot be used.

In this embodiment, for solving this problem, two logical router are prepared in a router. While one of the two logical routers performs relay operation for current packets, operation is checked for another logical router based on new configurations. Then, after operation is checked to be correct, the routers are switched so that the time during which the network cannot be used is minimized.

Figure 4:
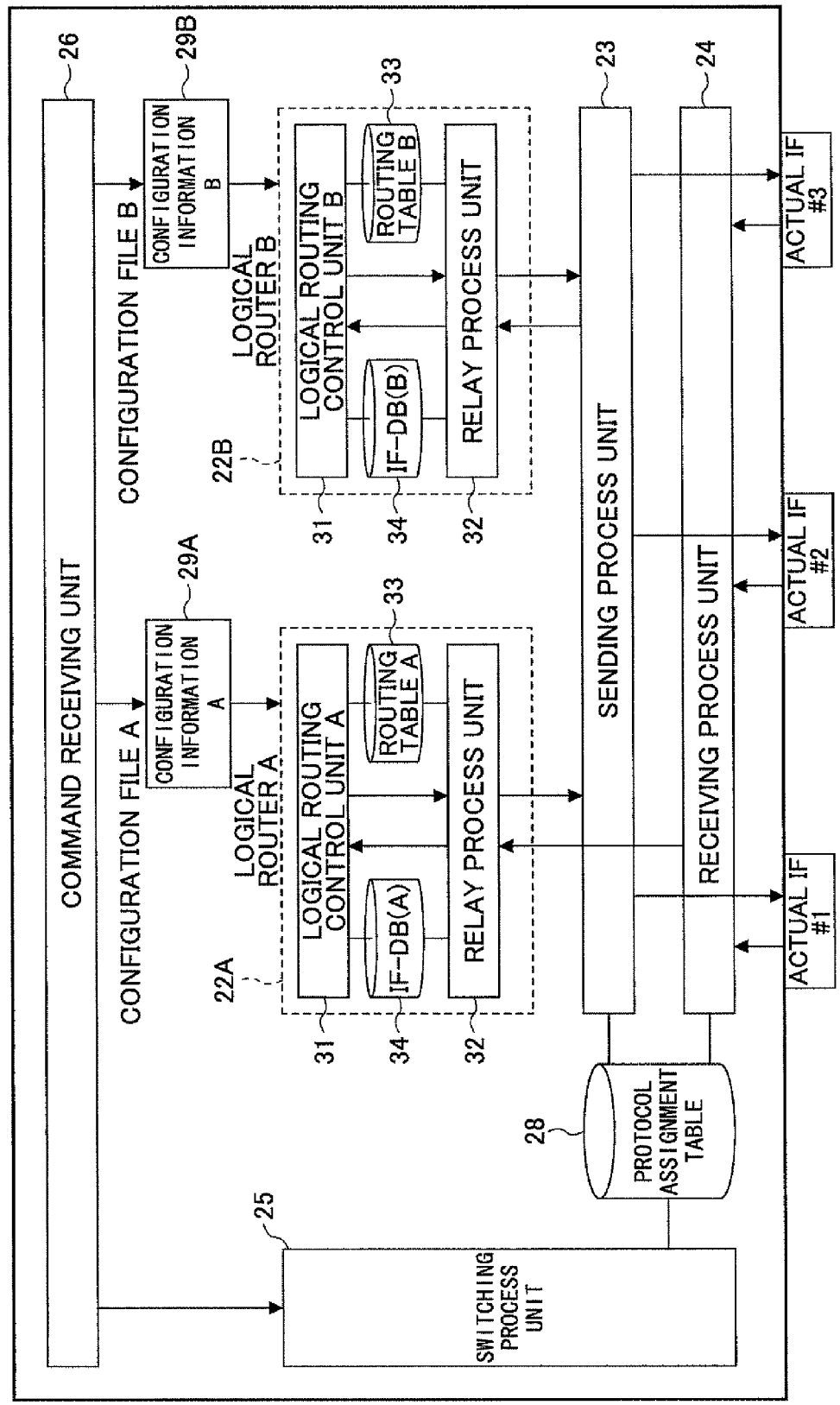
FIG. 4 is a block diagram of a relay apparatus of an embodiment of the present invention.

FIG. 4 shows a block diagram of a relay apparatus (router) of an embodiment of the present invention. As shown in the diagram, the router includes two logical routers 22A and 22B, a sending process unit 23, a receiving process unit 24, a switching process unit 25, a command receiving unit 26, actual IFs (interfaces) #1, #2, and #3, a protocol assignment table 28 and configuration files 29A and 29B for the logical routers 22A and 22B respectively.

The logical routers 22A and 22B (corresponding to 12A and 12B in FIG. 2) are router functions logically separated in the relay apparatus. Each of the logical routers 22A and 22B includes a logical routing control unit 31, a relay process unit 32, a routing table 33, an IF-DB (interface database) 34.

The logical routing control unit 31 (corresponding to 16 in FIG. 2) manages address information of the interfaces and exchanges routing information with a logical routing control unit 31 of another router according to the configuration file.

The relay process unit 32 (corresponding to 17 in FIG. 2) receives a packet or relay a packet to another actual IF based on the routing table 33 and the IF-DB 34 that are formed by the logical routing control unit 31. In addition, the relay process unit 32 performs sending processes by adding an IP header to a message sent by the logical routing control unit 31. In addition, the relay process unit 32 generates a response packet for responding to a received test packet and sends the response packet to a source of the test packet.

The routing table 33 is a table in which correspondences between destination addresses and output IFs are recorded. The logical routing control unit 31 records route information, into the routing table 33, that is obtained by exchanging routing messages with other routers or obtained from static configuration by a manager. The relay process unit 32 refers to the routing table 33 for determining a relay destination when receiving a packet.

The IF-DB 34 is a database in which address information is registered for each IF. The address information is set by the logical routing control unit 31 according to configuration information of the configuration file. The IF-DB 34 is also used by the relay process unit 32 for identifying a packet addressed to the own apparatus.

When the sending process unit 23 (corresponding to 13 in FIG. 2) receives an IP packet to be sent to the outside from the logical router, the sending process unit 23 refers to the protocol assignment table 28, checks a protocol type value that is designated for each logical router, adds a data link layer header (Ether header in this embodiment) by configuring the protocol type value, and outputs the packet to an actual IF corresponding to a destination of the packet.

When receiving a packet from an actual IF, the receiving process unit 24 (corresponding to 14 in FIG. 2) refers to the protocol assignment table 28 using the protocol type value as a key to distribute the packet to the relay process unit 32 of a corresponding logical router. In addition, when the receiving process unit 24 receives a protocol switching message, the receiving process unit 24 reports it to the switching process unit 25.

The command receiving unit 26 receives an input such as a router management command and a configuration by a manager from a console connected to the router so as to generate a protocol switching message based on the input of the command.

The switching process unit 25 (corresponding to 15 in FIG. 2) switches a current logical router from a currently used logical router to a newly configured logical router. In addition, the switching process unit 25 rewrites the protocol assignment table 28 to update it such that a protocol type value (IPv4=0x800) used for the current system becomes a value for the newly configured logical router.

The protocol assignment table 28 is a table for recording correspondences between identifiers of the logical routers 22A and 22B and protocol type values of the data link layer. The switching process unit 25 sets and updates the table 28, and the sending process unit 23 and the receiving process unit 24 refer to the table 28.

The configuration files 29A and 29B are files for recording configuration information of the logical routers 22A and 22B respectively. The command receiving unit 26 sets the file, and the logical routers 22A and 22B refers to the files. The actual interface is an interface in the data link layer in the router apparatus.

Figure 5:
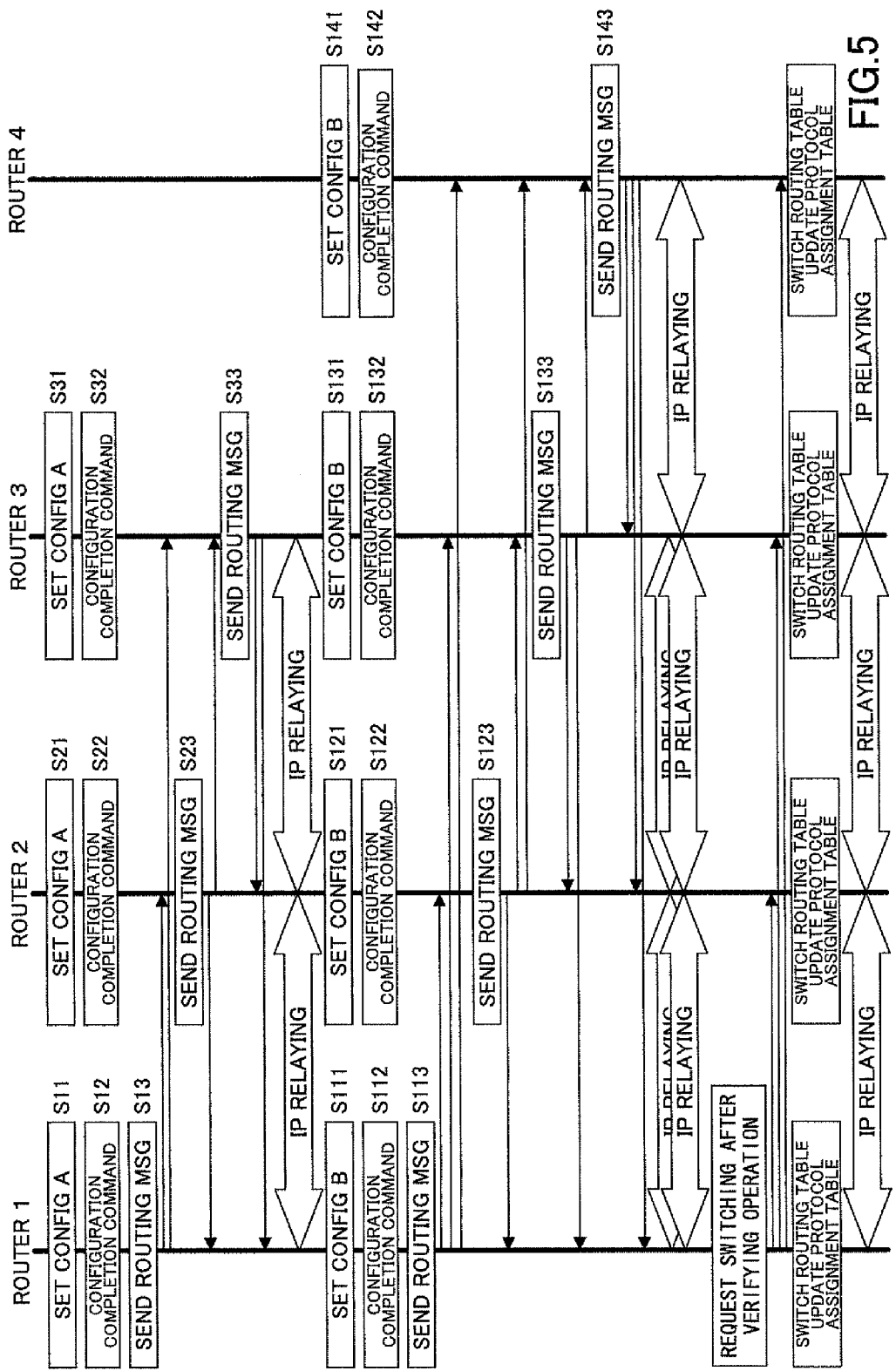
FIG. 5 is a flowchart showing a system operation of a first embodiment of the present invention.

FIG. 5 is a flowchart showing a system operation of the first embodiment of the present invention.

<Current Network Configuring Phase>

A network manager prepares a current network shown in FIG. 3A using relay apparatuses of the present invention beforehand.

In the protocol assignment table 28 of each router, as default values, "0x800" is stored as a protocol type value of the logical router 22A, and "0x7FF" is stored as a protocol type value of the logical router 22B as shown in FIG. 6.

Next, a network manager makes new configuration settings for the logical router A for each router. More particularly, the network manager connects a console to each router to access the command receiving unit 26. Then, the command receiving unit 26 stores configuration information input by the manager into the configuration file 29A.

More particularly, the network manager writes configuration information shown in FIG. 7 into the configuration file 29A for the logical router 22A of the router R1 (in step S11 in FIG. 5). The network manager sends a configuration completion command when the information is written into the configuration file. Accordingly, the logical router 22A of the router R1 registers the information to the IF-DB 34, and launches a RIP process so as to start route exchange using the RIP protocol (steps S12 and S13). FIG. 8 shows the IF-DB 34 generated by the logical routing control unit 31.

In addition, the network manager writes configuration information shown in FIG. 9 into a configuration file for the logical router 22A of the router R2 (in step S21). The network manager sends a configuration completion command when the information is written into the configuration file. Accordingly, the logical router 22A of the router R2 registers the information to the IF-DB 34, and launches a RIP process so as to start route exchange using the RIP protocol (steps S22 and S23). FIG. 10 shows the IF-DB 34 generated by the logical routing control unit 31.

In addition, the network manager writes configuration information shown in FIG. 11 into a configuration file for the logical router 22A of the router R3 (in step S31). The network manager sends a configuration completion command when the information is written into the configuration file. Accordingly, the logical router 22A of the router R3 registers the information to the IF-DB 34, and launches a RIP process so as to start route exchange using the RIP protocol (steps S32 and S33). FIG. 12 shows the IF-DB 34 generated by the logical routing control unit 31.

Figure 14:
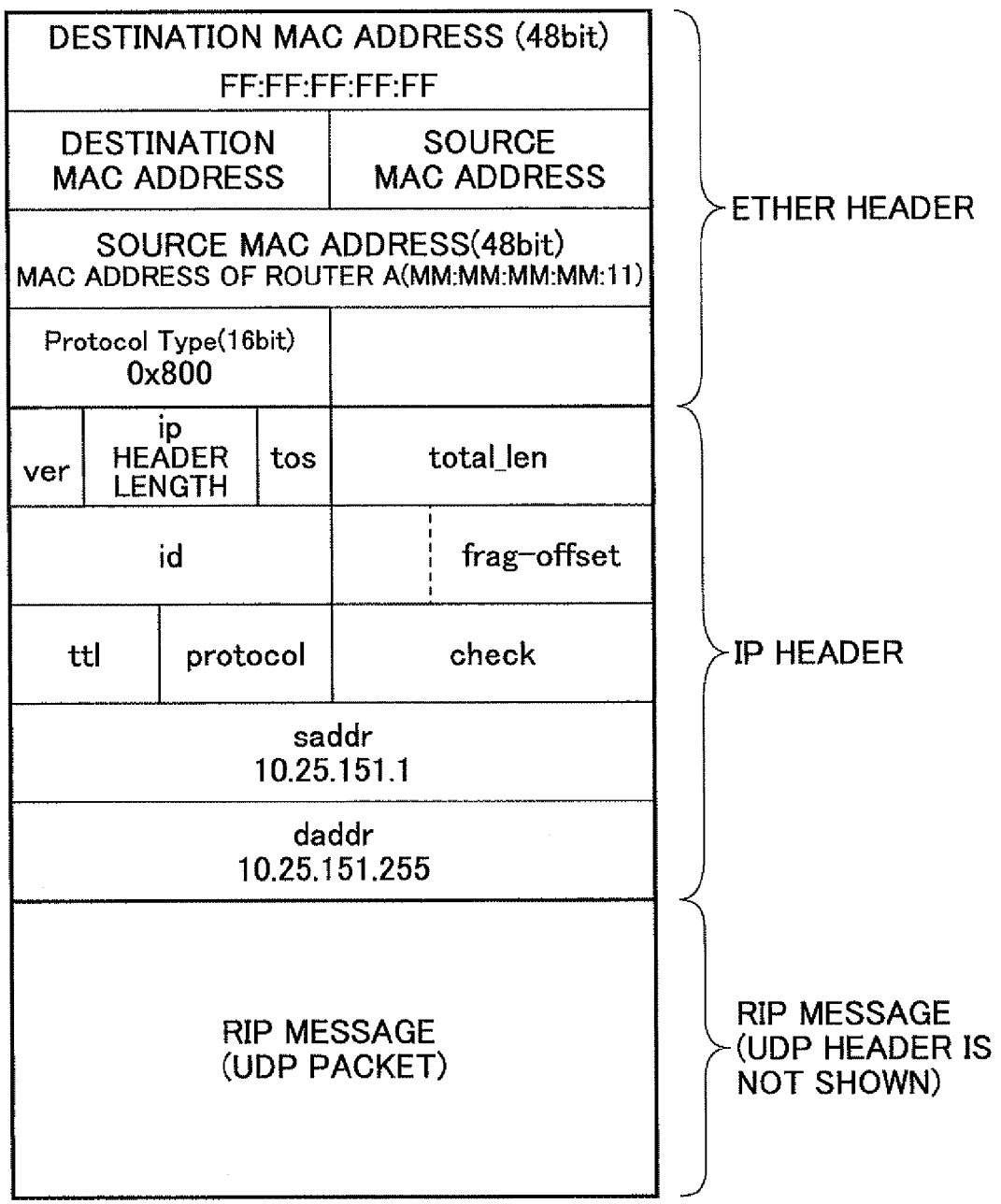
FIG. 14 is a diagram showing a routing message based on RIP protocol.

In steps S13, S23 and S33, the logical router 22A of each router exchanges a routing message, with a logical router 22A of another router, shown in FIG. 14 based on the RIP protocol carried by a MAC frame. In the route exchange, the logical router 22A sends an IP packet including the RIP routing message to the sending process unit 23. Then, the sending process unit 23 adds an Ether header to the IP packet and sends the frame from an actual IF. At this time, the sending process unit 23 refers to the protocol assignment table 28 to set "0x800 (indicating IPv4)" as a protocol type value of the Ether header (data link layer header) for the packet from the logical router 22A.

Figure 13:
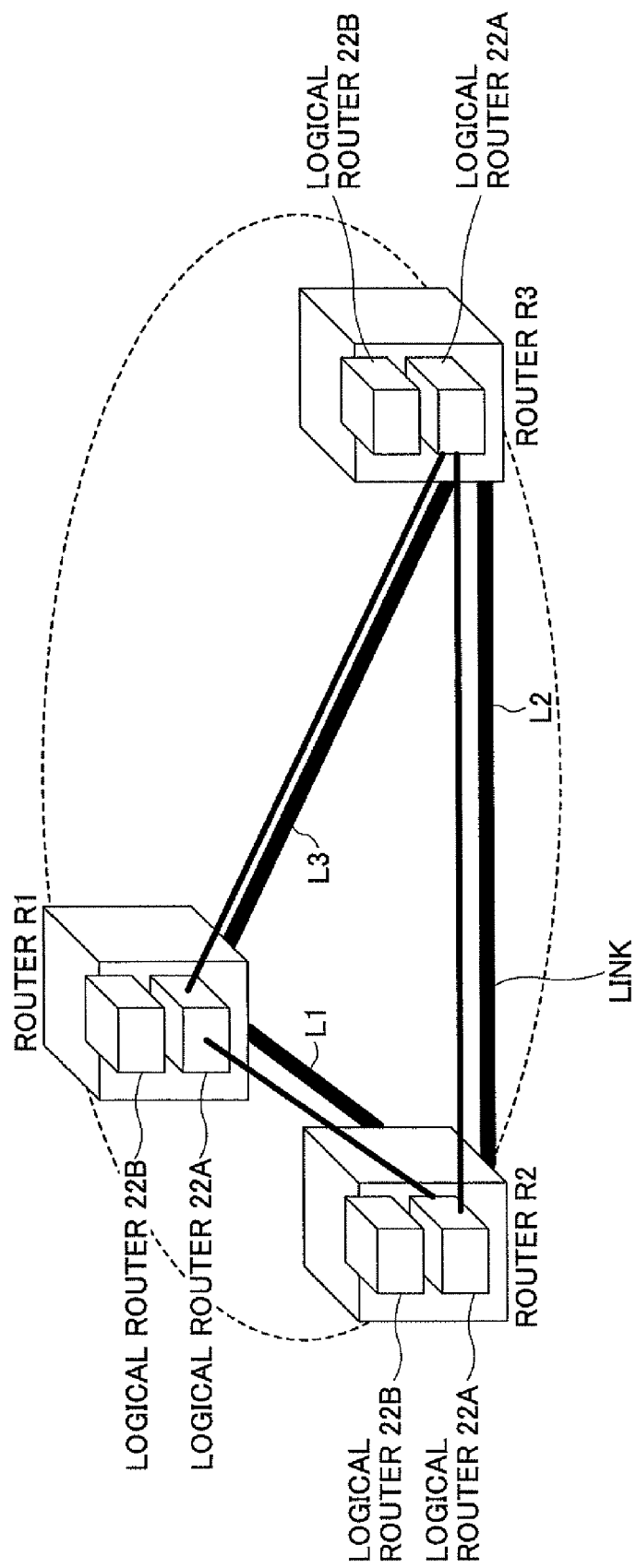
FIG. 13 is a diagram showing link status between routers.

Accordingly, the routers R1, R2 and R3 are interconnected via links L1, L2 and L3 as shown in FIG. 13.

<Operation for Receiving a Packet>

When the receiving process unit 24 of each router receives a MAC frame and when a destination MAC address of the MAC frame is a MAC address of the own router (in this case, since the address is a broadcast address FF:FF:FF:FF:FF, the receiving process unit 24 receives the frame unconditionally), the receiving process unit 24 refers to the protocol assignment table 28 using the protocol type value (=0x800) of the Ether header of the MAC frame as a key, checks an identifier of a logical router corresponding to the protocol type value (logical router 22A in this case), and passes an IP packet in the received frame to the relay process unit 32 of the logical router 22A. The relay process unit 32 refers to the IF-DB 34. When the destination address (daddr) of the IP header is the same as the IP address of the own router, the relay process unit 32 passes the packet to the logical routing control unit 31.

When the logical routing control unit 31 of each of the routers R1, R2 and R3 receives the RIP routing message from a logical routing control unit 31 of other routers, the logical routing control unit 31 that receives the RIP routing message generates a routing table 33 of the logical router 22A shown in FIGS. 15, 16 and 17.

FIG. 15 shows a routing table 33 of the logical router 22A of the router R1. The first line of the table indicates that an address of a next hop router corresponding to a destination address "10.25.163.0/24" is "10.25.153.2" corresponding to the router R3, and that the packet is output from an actual IF#1.

FIG. 16 shows a routing table 33 of the logical router 22A of the router R2. The second line of the table indicates that an address of a next hop router corresponding to a destination address "10.25.161.0/24" is "10.25.151.1" corresponding to the router R1, and that the packet is output from an actual IF#0. FIG. 17 shows a routing table 33 of the logical router 22A of the router R3. The first line of the table indicates that an address of a next hop router corresponding to a destination address "10.25.161.0/24" is "10.25.153.1" corresponding to the router R1, and that the packet is output from an actual IF#1.

After that, when the router R1, R2, R3 receives a frame including user data from a subnetwork S1, S2, S3 under the router, the receiving process unit 24 checks a protocol type value of the Ether header of the MAC frame. When the protocol type value is "0x800" indicating IPv4, the receiving process unit 24 passes the MAC frame to the relay process unit 32 of the logical router 22A. When the IP address is not for the own router, the relay process unit 32 refers to the routing table 33 of the logical router 22A to determine an output IF and pass the IP packet to the sending process unit 23.

The sending process unit 23 refers to the protocol assignment table 28. In this case, since the IP packet is one from the logical router 22A, the sending process unit 23 selects the protocol type value "0x800" to set the protocol type value "0x800" for the IP packet. In addition, the sending process unit 23 sets a MAC address corresponding to the destination IP address as a destination MAC address, and sets a MAC address of a sending IF of the own apparatus as a source MAC address. Then, the sending process unit 23 outputs the frame from an actual IF designated in the routing table 33.

<New Configuration Setting Phase>

Next, operation is described in a case where a new subnetwork and a new router are added as shown in FIG. 3B due to establishment of a new department in an organization, for example.

Figure 18:
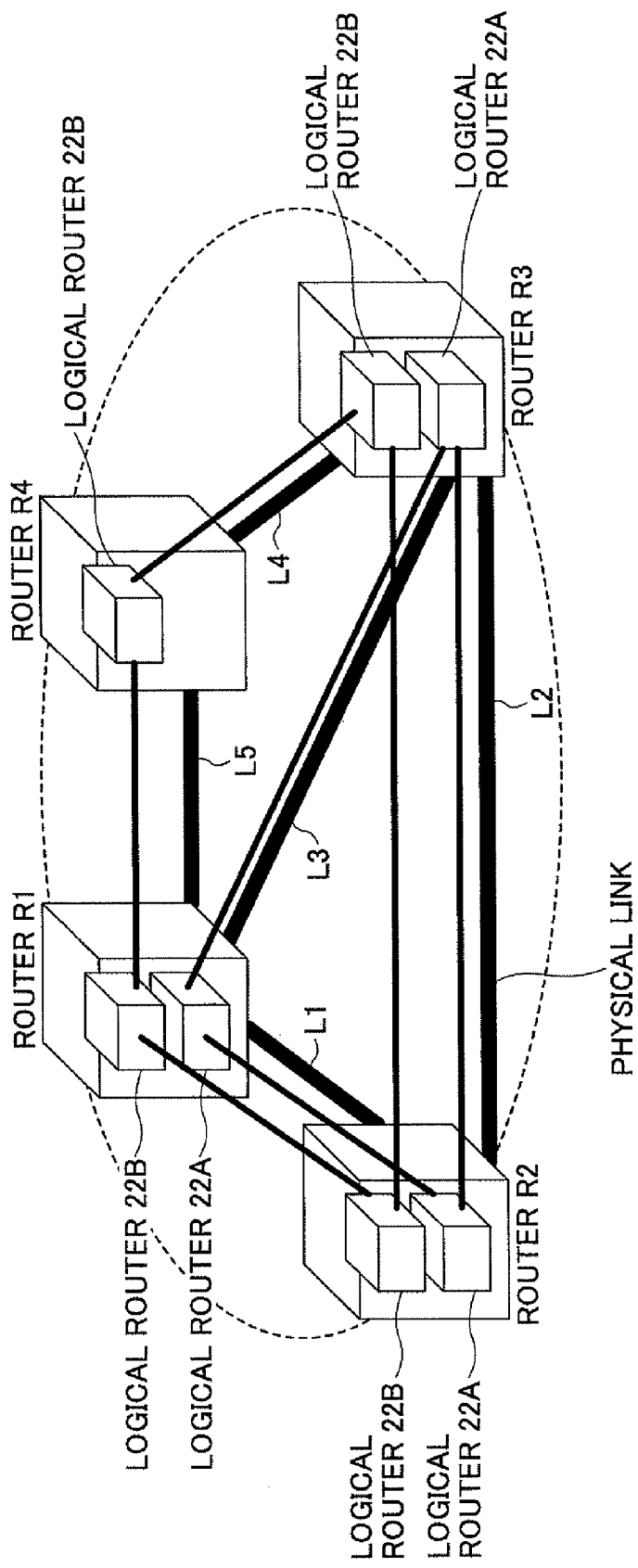
FIG. 18 is a diagram showing link status between routers.

As shown in FIG. 18, a network manager connects the router R4 to the routers R1 and R3 via links L5 and L4 respectively. At this time, relay operation of the logical router 22A in each router is kept continued.

Next, the network manager makes new configuration settings for the logical router 22B of each router. More particularly, the network manager connects a console to each router to access the command receiving unit 26 so that the command receiving unit 26 writes configuration information described by the manager into the configuration file 29B.

More particularly, the network manager writes configuration information shown in FIG. 19 into the configuration file 29B for the logical router 22A of the router R1 (in step S111). The network manager sends a configuration completion command when the information is written into the configuration file. Accordingly, the logical router 22B of the router R1 registers the information to the IF-DB 34, and launches a RIP process so as to start route exchange using the RIP protocol (steps S112 and S113). FIG. 20 shows the IF-DB 34 generated by the logical routing control unit 31.

In addition, the network manager writes configuration information shown in FIG. 21 into the configuration file 29B for the logical router 22B of the router R2 (in step S121). As to the router R2, configuration information of the logical router 22B is the same as that for the logical router 22A. The network manager sends a configuration completion command when the information is written into the configuration file. Accordingly, the logical router 22B of the router R2 registers the information to the IF-DB 34, and launches a RIP process so as to start route exchange using the RIP protocol (steps S122 and S123). FIG. 22 shows the IF-DB 34 generated by the logical routing control unit 31.

In addition, the network manager writes configuration information shown in FIG. 23 into the configuration file 29B for the logical router 22B of the router R3 (in step S131). The network manager sends a configuration completion command when the information is written into the configuration file. Accordingly, the logical router 22B of the router R3 registers the information to the IF-DB 34, and launches a RIP process so as to start route exchange using the RIP protocol (steps S132 and S133). FIG. 24 shows the IF-DB 34 generated by the logical routing control unit 31.

Further, the network manager writes configuration information shown in FIG. 25 into the configuration file 29B for the logical router 22B of the router R4 (in step S141). The network manager sends a configuration completion command when the information is written into the configuration file. Accordingly, the logical router 22B of the router R4 registers the information to the IF-DB 34, and launches a RIP process so as to start route exchange using the RIP protocol (steps S142 and S143). FIG. 26 shows the IF-DB 34 generated by the logical routing control unit 31.

Figure 27:
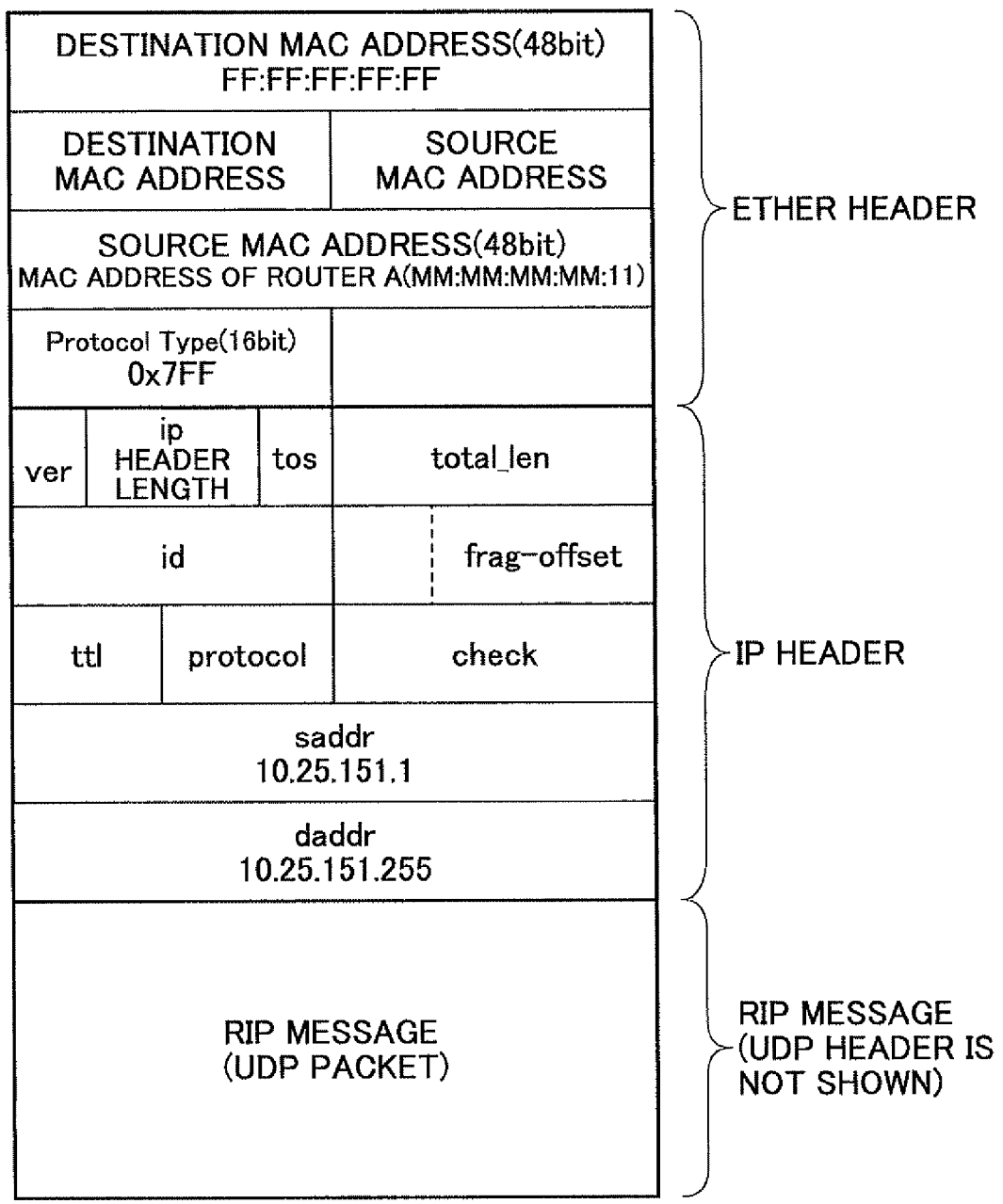
FIG. 27 is a diagram showing a routing message based on RIP protocol.

In steps S113, S123, S133 and S143, the logical router 22B of each router exchanges a routing message, with the logical router 22B of other routers, shown in FIG. 27 based on the RIP protocol carried by a MAC frame. In the route exchange, the logical router 22B sends an IP packet including the RIP routing message to the sending process unit 23. Then, the sending process unit 23 adds an Ether header to the IP packet and sends the frame from an actual IF. At this time, the sending process unit 23 refers to the protocol assignment table 28 to set "0x7FF" as a protocol type value of the Ether header (data link layer header) for the packet from the logical router 22B, wherein "0x7FF" is a protocol type value that does not overlap with other protocol in this network.

<Operation when Receiving a Packet>

When the receiving process unit 24 of the router receives a MAC frame and when a destination MAC address of the MAC frame is a MAC address of the own router (in this case, since the address is a broadcast address FF:FF:FF:FF:FF, the receiving process unit 24 receives the frame unconditionally), the receiving process unit 24 refers to the protocol assignment table 28 using the protocol type value (=0x7FF) of the Ether header of the MAC frame as a key, checks an identifier of a logical router corresponding to the protocol type value (logical router 22B in this case), and passes an IP packet in the received frame to the relay process unit 32 of the logical router 22B. The relay process unit 32 refers to the IF-DB 34. When the destination address (daddr) of the IP header is the same as the IF address of the own router and the packet is a RIP packet, the relay process unit 32 passes the packet to the logical routing control unit 31.

When the logical routing control unit 31 of the logical router 22B of each of the routers R1, R2, R3 and R4 receives the RIP routing message from the logical routing control unit 31 of other routers, the logical routing control unit 31 that receives the RIP routing message generates a routing table 33 of the logical router 22B shown in FIGS. 28, 29, 30 and 31.

FIG. 28 shows a routing table 33 of the logical router 22B of the router R1. The first line of the table indicates that an address of a next hop router corresponding to a destination address "10.25.164.0/24" is "10.25.153.2" corresponding to the router R3, and that the packet is output from an actual IF#1.

FIG. 31 shows a routing table 33 of the logical router 22B of the router R4. The first line of the table indicates that an address of a next hop router corresponding to a destination address "10.25.161.0/24" is "10.25.154.2" corresponding to the router R3, and that the packet is output from an actual IF#1.

After that, when the router (R1, R2, R3, R4) receives a frame including user data from a subnetwork (S1, S2, S3, S4, and L1, L2, L3, L4) under the router, the receiving process unit 24 checks a protocol type value of the Ether header of the MAC frame. When the protocol type value is "0x7FF", the receiving process unit 24 passes the MAC frame to the relay process unit 32 of the logical router 22B. When the IP address is not for the own router, the relay process unit 32 refers to the routing table 33 of the logical router 22B to determine an output IF and pass the IP packet to the sending process unit 23.

The sending process unit 23 refers to the protocol assignment table 28. In this case, since the IP packet is one from the logical router 22B, the sending process unit 23 selects the protocol type value "0x7FF" to set the protocol type value into the IP packet. In addition, the sending process unit 23 sets a MAC address corresponding to the destination IP address as a destination MAC address, and sets a MAC address of a sending IF of the own router as a source MAC address. Then, the sending process unit 23 outputs the packet from an actual IF designated by the routing table 33.

In addition, when the router R1, R2, R3, R4 receives a frame for which the protocol type value is "0x800", the router passes the IP packet to the logical router 22A to perform the before-mentioned relay operation.

<Operation Switching Phase>

After the network manager verifies that the logical router 22B of each router operates as expected, the network manager switches a current logical router from the logical router 22A to the logical router 22B.

For checking whether network configuration is properly made, the network manager visually checks information of the routing tables 33 shown in FIGS. 28-31 generated by the logical routers 22B. Alternatively, the network manager executes a traceroute command from the logical router 22B of each router to transmit a packet to a target network, and checks which route the packet passes through.

More particularly, as shown in FIGS. 32-35, the traceroute command is executed from each router to each subnetwork. In the figures, a test packet of ICMP (Internet Control Message Protocol) is transmitted as shown by a solid line with an arrow as a result of the execution of the command.

Figure 32:
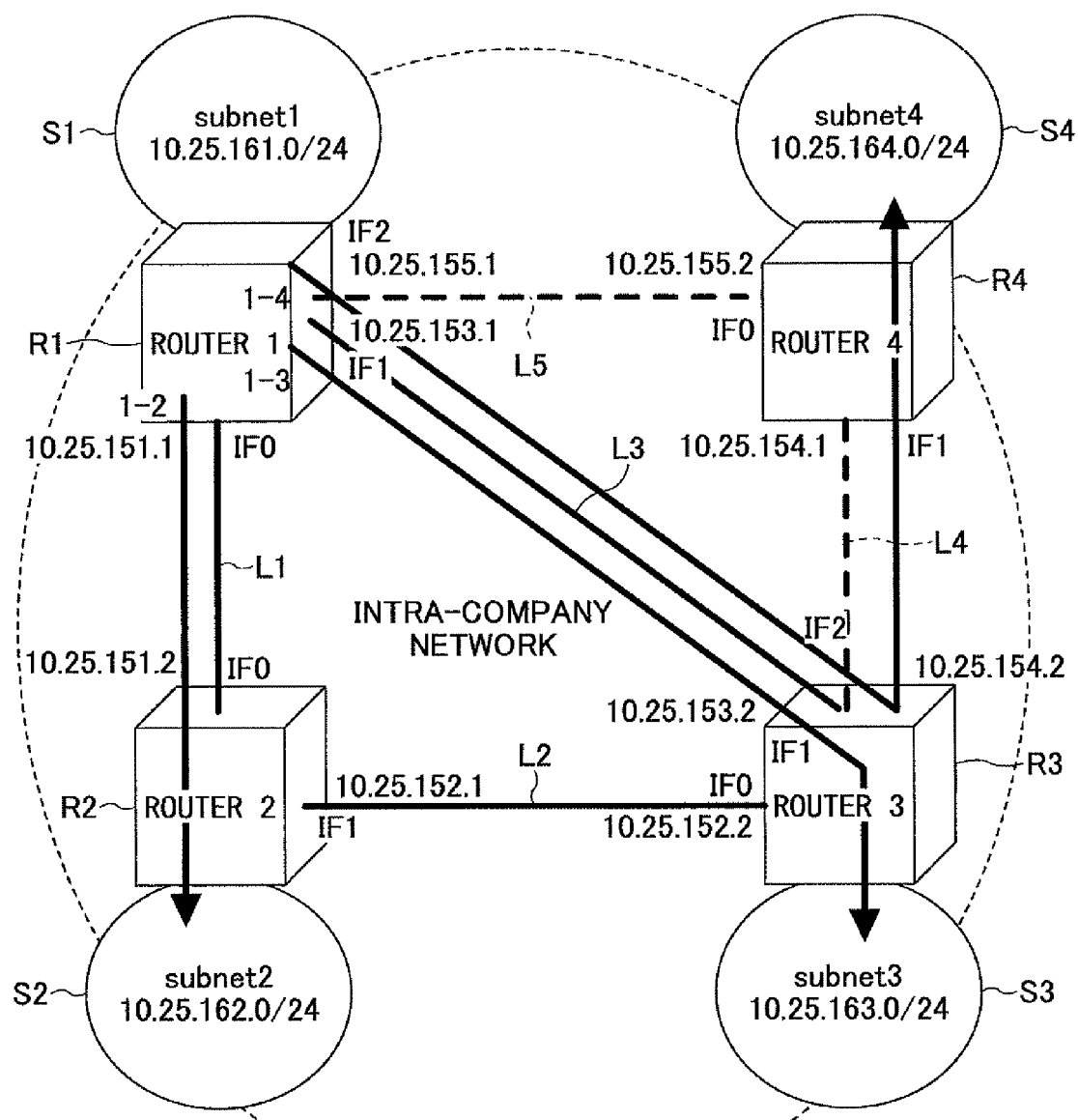
FIG. 32 is a diagram for explaining checking of network configuration.

As shown in FIG. 32, the test packet is sent from the logical router 22B of the router R1 to the subnetworks S2 and S3 respectively through a shortest route, and the test packet is sent to the subnetwork S4 from the router R1 via the router R3 avoiding the link L5, which means the test packet flows according to the intended configuration. By the way, the ICMP test packet has a format obtaining by replacing a part of RIP message of the MAC frame shown in FIG. 27 with the ICMP message.

Figure 33:
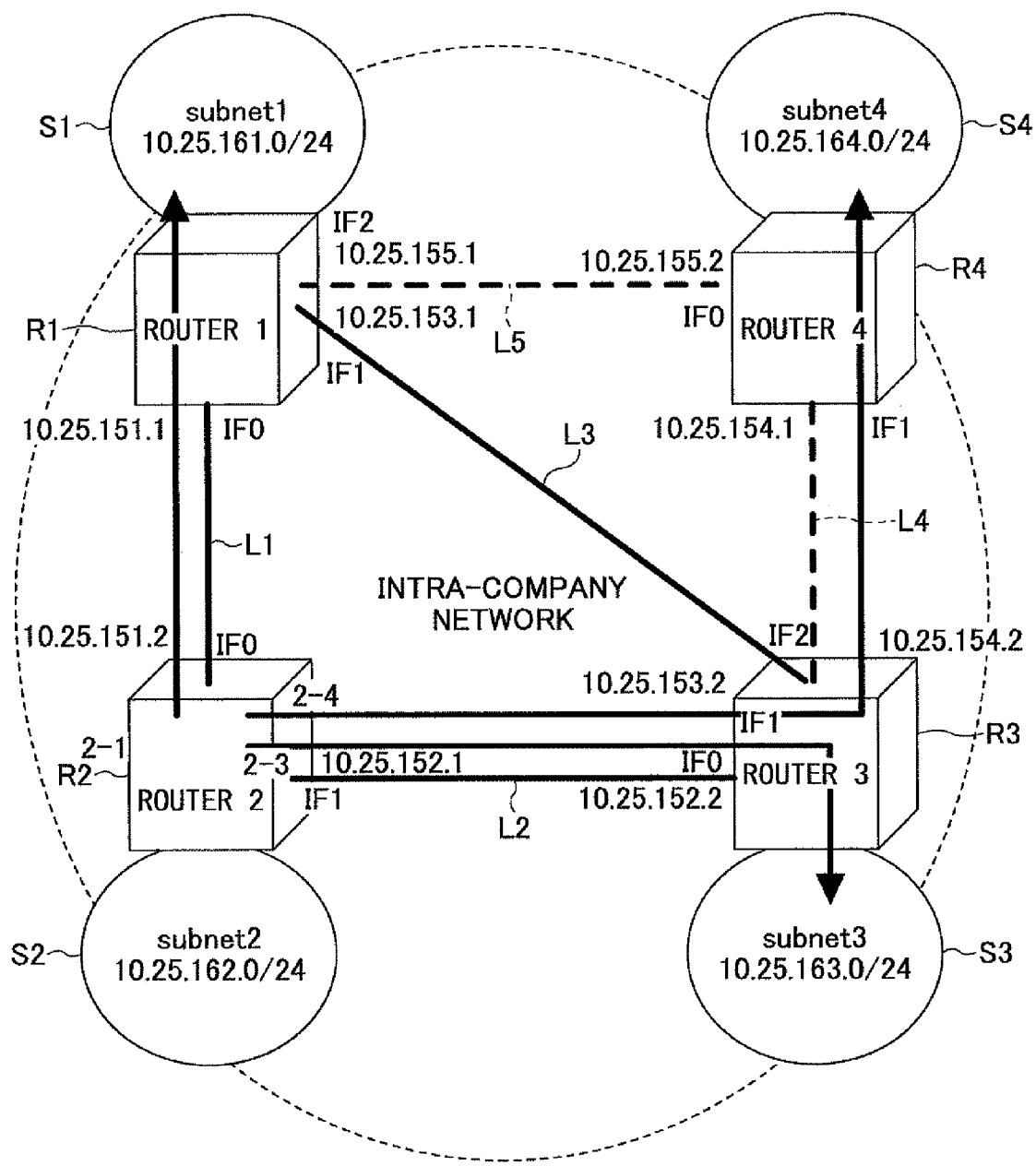
FIG. 33 is a diagram for explaining checking of network configuration.
Figure 34:
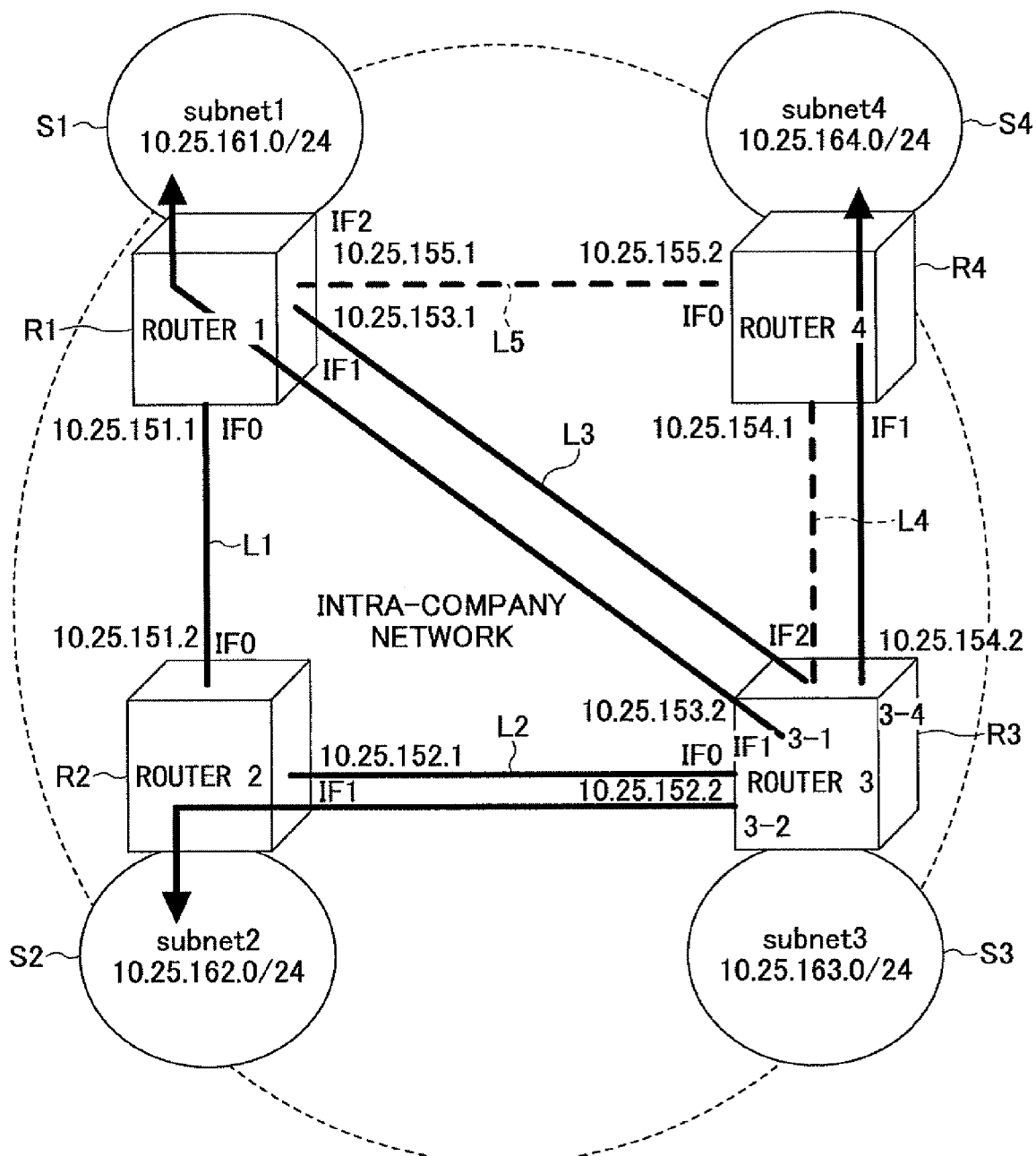
FIG. 34 is a diagram for explaining checking of network configuration.

As shown in FIG. 33, the test packet is sent from the logical router 22B of the router R2 to the subnetworks S1 and S3 respectively through a shortest route, and the test packet is sent to the subnetwork S4 from the router R2 via the router R3 avoiding the link L5, which also means the packet flows according to the intended configuration. As shown in FIG. 34, the test packet is sent from the logical router 22B of the router R3 to the subnetworks S1 and S3 respectively through a shortest route, and the packet is sent to the subnetwork S4 from the router R3 through a shortest route avoiding the link L5, which also means the packet flows according to the intended configuration.

Figure 35:
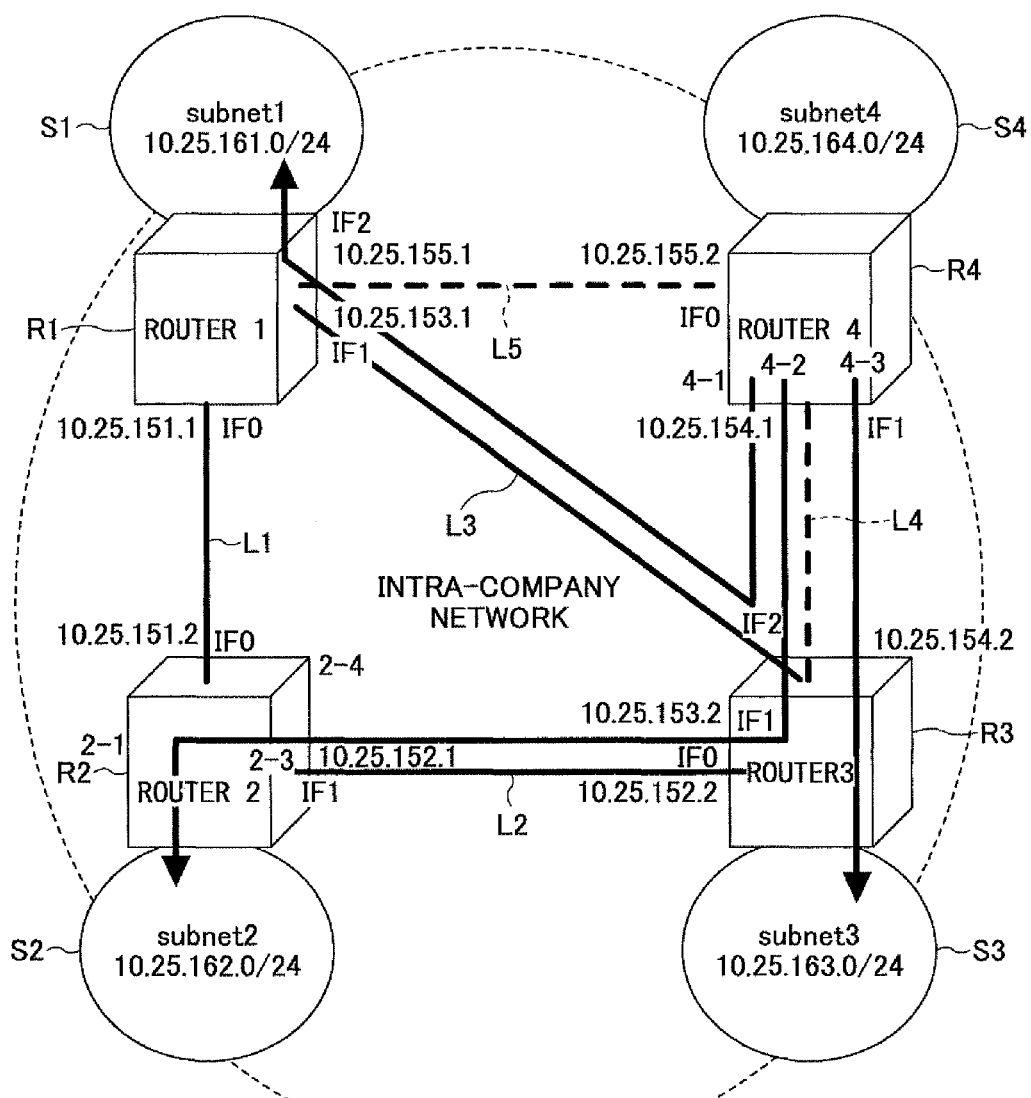
FIG. 35 is a diagram for explaining checking of network configuration.

As shown in FIG. 35, the test packet is sent to the subnetwork S1 from the router R4 via the router R3 avoiding the link L5, the test packet is also sent to the subnetwork S2 avoiding the link L5, and the test packet is sent to the subnetwork S3 though a shortest route, which means the packet flows according to the intended configuration. Accordingly, the network manager can confirm that configuration information set in the logical router 22B of each of the routers R1-R4 is one as expected.

After verifying the operation of the logical router 22B, the network manager enters a switching command into the command receiving unit 26 of the router R1, for example, in order to change the current logical router from the logical router 22A to the logical router 22B. The switching process unit 25 that receives the command from the command receiving unit 26 sends the protocol switching message shown in FIG. 36 to all of the other routers R2-R4. The packet of the protocol switching message indicates to delete the logical router 22A from the protocol assignment table 28 and change the protocol type value of the logical router 22B to "0x800" at 2006/05/31 24:00.

When the switching process unit 25 of each router receives the protocol switching message, the switching process unit 25 updates the protocol assignment table 28 at 2006/05/31 24:00 designated by Action Time. In the updated protocol assignment table 28 in the routers R1-R4, the protocol type value "0x800" corresponding to the logical router 22B is set.

<Second Embodiment>

Also in the second embodiment, like the first embodiment, the network configuration is changed from current one shown in FIG. 3A to another one shown in FIG. 3B.

Figure 37:
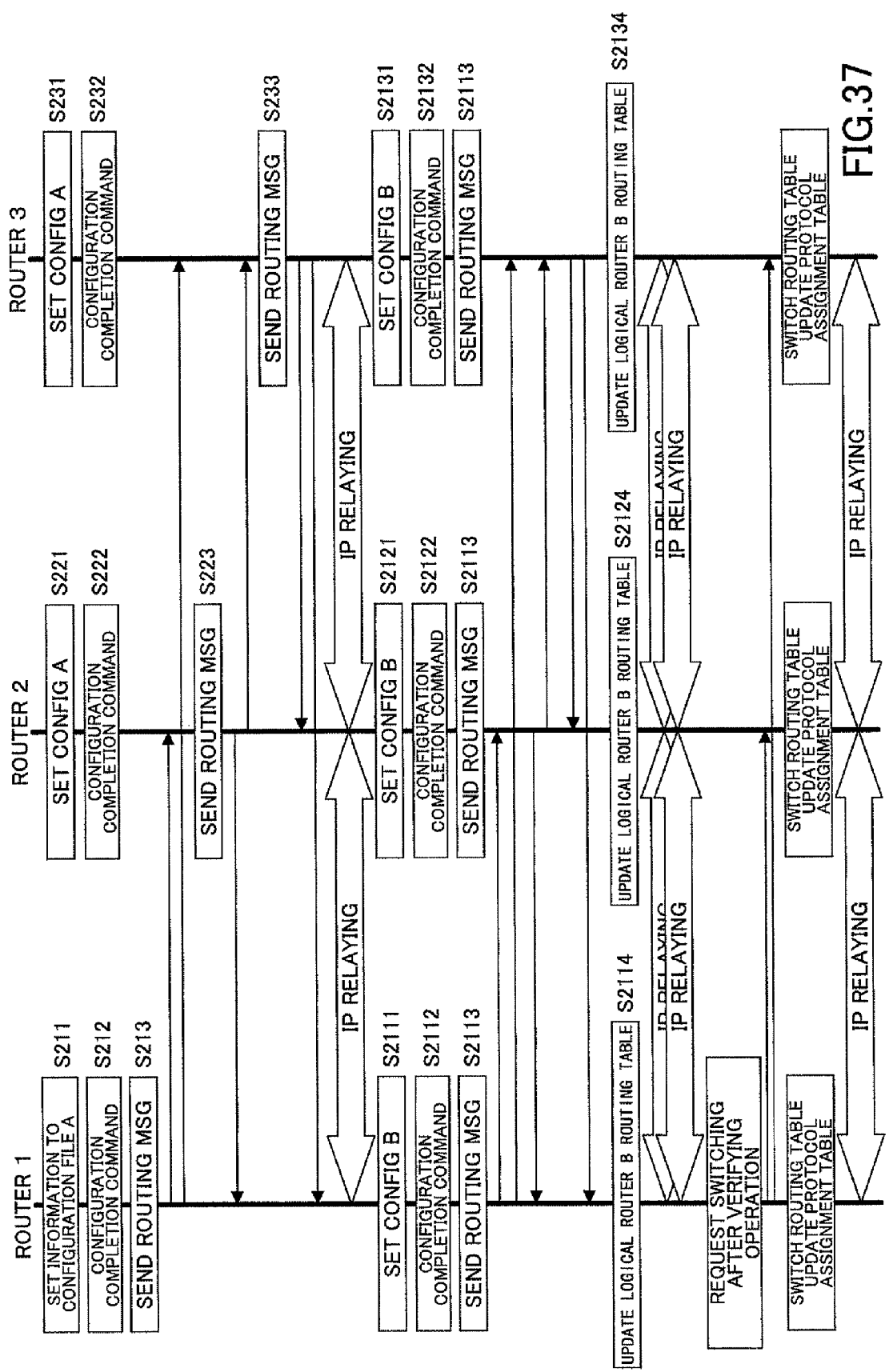
FIG. 37 is a flowchart showing a system operation of a second embodiment of the present invention.

FIG. 37 is a flowchart showing system operation of the second embodiment of the present invention.

<Current Network Configuration Phase>

A network manager prepares a current network shown in FIG. 3A using router apparatuses of the present invention beforehand.

In the protocol assignment table 28 of each router, as default values as shown in FIG. 38, "value other than 254" is set as a protocol value of the logical router 22A, and "254" is set as a protocol value for the logical router 22B. In the present embodiment, the logical router 22A adds an Ether header to an IP packet to send a MAC frame shown in FIG. 14. The logical router encapsulates an IP packet by adding an Outer IP header (protocol layer header) and further adds an Ether header to send a MAC frame (refer to after-mentioned FIG. 46). Then, the above-mentioned protocol value is used as an identifier of a protocol value field of the Outer IP header. The protocol value of the IP header is defined in IANA (Internet Assigned Numbers Authority), and 254 is an unused number used for experiments. By the way, in the present embodiment, the protocol type value of the Ether header is "0x800" for all frames, and the protocol type value "0x7FF" is not used.

After that, steps S211, S212, S213, S221, S222, S223, S231, S232 and S233 are performed in the same way as the first embodiment. The current network configuration phase of this embodiment is the same as that of the first embodiment.

<New Configuration Configuration Phase>

Figure 39:
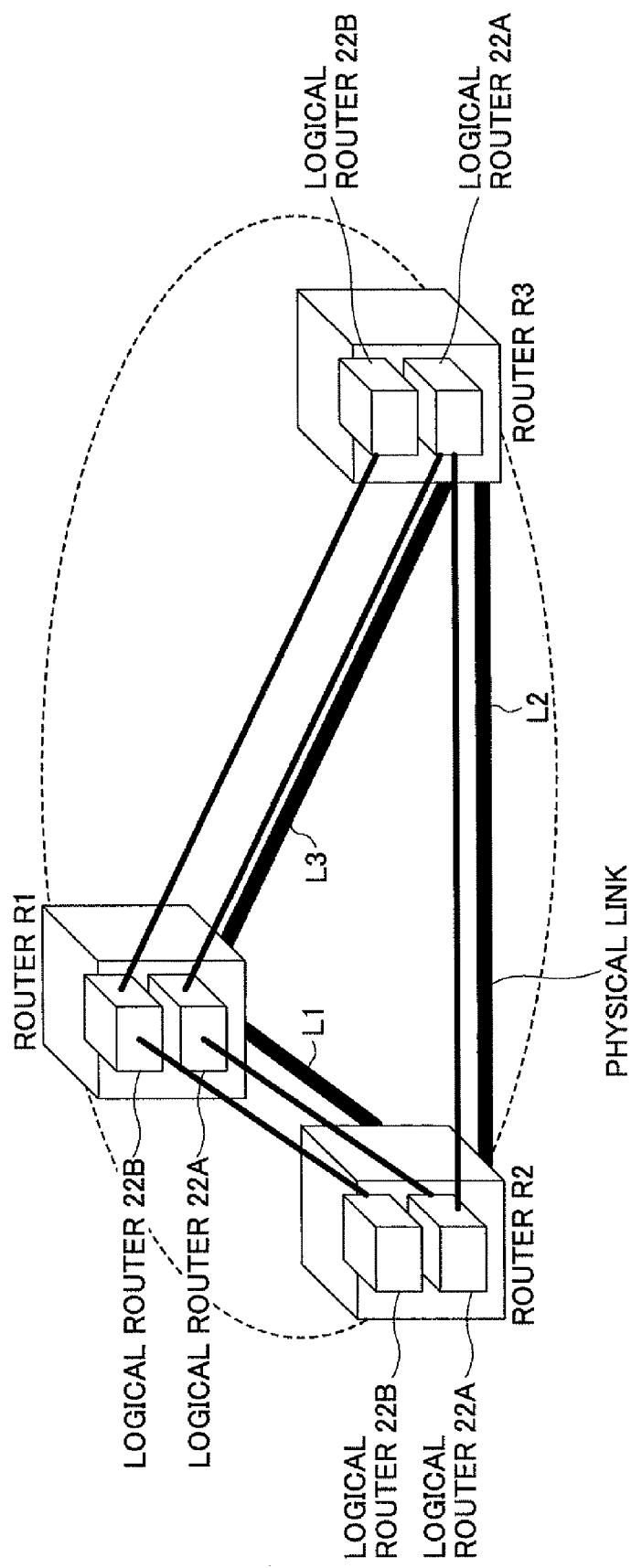
FIG. 39 is a diagram showing link status between routers.

In the second embodiment, the router network based on the new configuration can be applied only to updating within a range where a packet can reach by the configuration of the current network. Therefore, as shown in FIG. 39, as the new configuration example, configuration change to stop using the physical link L2 between the routers R2 and R3 that has been used is described.

First, a network manager makes new configuration settings for the logical router 22B for each of the routers R1-R3. More particularly, the network manager connects a console to each router to access the command receiving unit 26. Then, the command receiving unit 26 stores configuration information input by the manager into the configuration file 29B.

More particularly, the network manager writes configuration information shown in FIG. 40 into the configuration file 29B for the logical router 22B of the router R1 (in step S2111). As to the router R1, configuration information of the logical router 22B is the same as the configuration information of the logical router 22A. The network manager sends a configuration completion command when the information is written into the configuration file. Accordingly, the logical router 22B of the router R1 registers the information to the IF-DB 34, and launches a RIP process so as to start route exchanges using the RIP protocol (steps S2112 and 2113). FIG. 41 shows the IF-DB 34 generated by the logical routing control unit 31.

In addition, the network manager writes configuration information shown in FIG. 42 into a configuration file for the logical router 22B of the router R2 (in step S2121). The network manager sends a configuration completion command when the information is written into the configuration file. Accordingly, the logical router 22B of the router R2 registers the information to the IF-DB 34, and launches a RIP process so as to start route exchange using the RIP protocol (steps S2122 and S2123). FIG. 43 shows the IF-DB 34 generated by the logical routing control unit 31.

In addition, the network manager writes configuration information shown in FIG. 44 into a configuration file for the logical router 22B of the router R3 (in step S2131). The network manager sends a configuration completion command when the information is written into the configuration file. Accordingly, the logical router 22B of the router R3 registers the information to the IF-DB 34, and launches a RIP process so as to start route exchange using the RIP protocol (steps S2132 and S2133). FIG. 45 shows the IF-DB 34 generated by the logical routing control unit 31.

Figure 46:
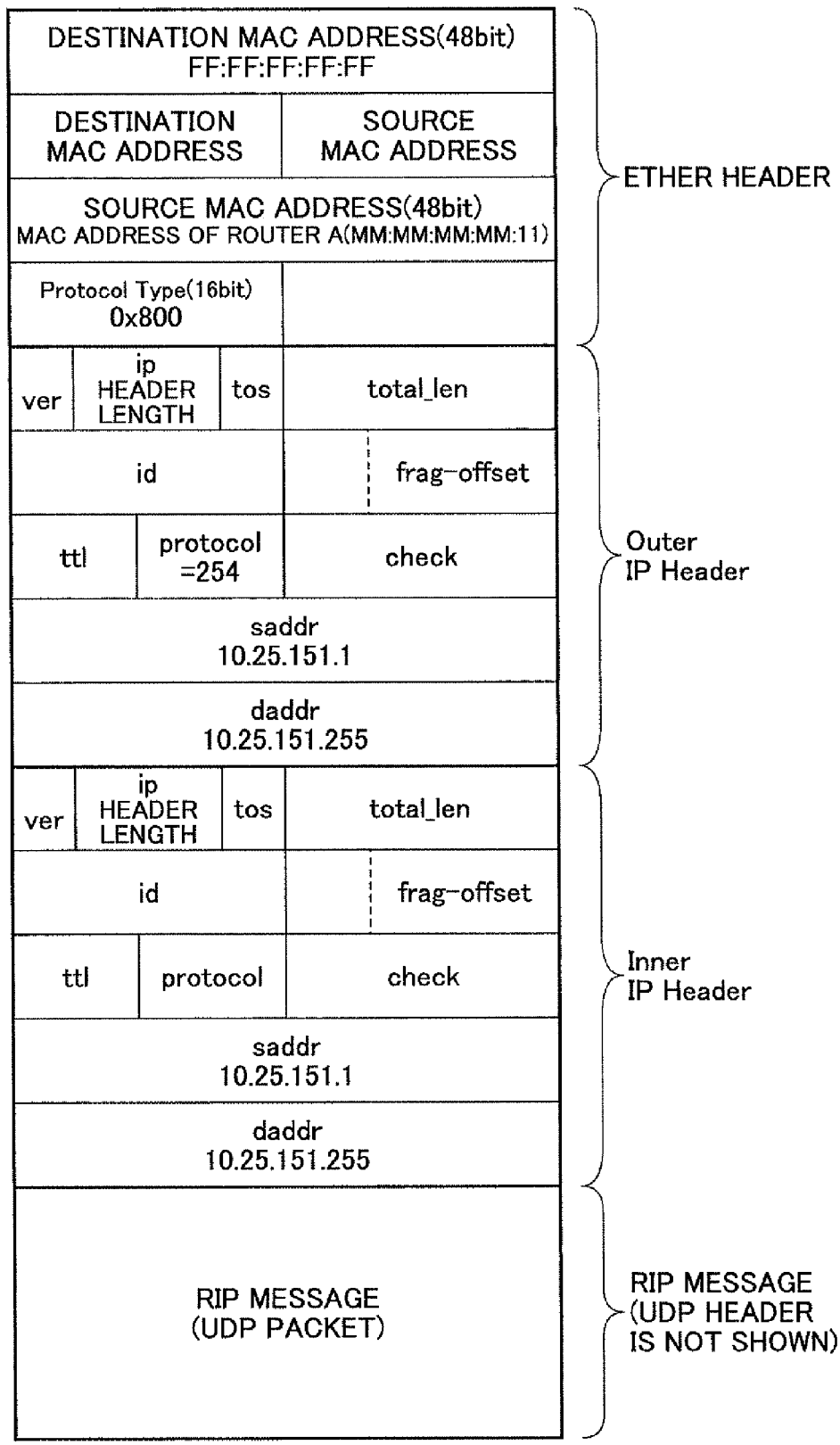
FIG. 46 is a diagram showing a routing message based on RIP protocol.

In steps S2113, S2123 and S2133, the logical router 22B of each router exchanges a routing message, with a logical router 22B of other routers, shown in FIG.46 based on the RIP protocol carried by a MAC frame. In the route exchange, the logical router 22B sends an IP packet (Inner IP header+RIP message) including the RIP routing message to the sending process unit 23. Each router then updates logical router routing table in steps S2114, S2124, and S2134. Then, the sending process unit 23 encapsulates the IP packet (IP in IP) by further adding an Outer IP header in the lower layer of the IP packet and adds an Ether header to the IP packet and sends the frame from an actual IF. At this time, the sending process unit 23 refers to the protocol assignment table 28 to set "254" as a protocol value of the Outer IP header for the packet from the logical router 22B.

<Operation for Receiving a Packet>

When the receiving process unit 24 of the router receives a MAC frame and when a destination MAC address of the MAC frame is a MAC address of the own router (in this case, since the address is a broadcast address FF:FF:FF:FF:FF, the receiving process unit 24 receives the frame unconditionally), the receiving process unit 24 refers to the protocol assignment table 28 using the protocol value (=254) of the first IP header as a key, checks an identifier of a logical router corresponding to the protocol value (logical router 22B in this case), and passes an IP packet within the IP header to the relay process unit 32 of the logical router 22B. The relay process unit 32 refers to the IF-DB 34. When the destination address (daddr) of the IP header is the same as the IF address of the own router and when the message is RIP, the relay process unit 32 passes the packet to the logical routing control unit 31.

When the logical routing control unit 31 of each of the routers R1, R2 and R3 receives the RIP routing message from a logical routing control unit 31 of other routers, the logical routing control unit 31 that receives the RIP routing message generates a routing table 33 shown in FIGS. 47, 48 and 49.

By the way, FIG. 47 shows a routing table 33 of the logical router 22B of the router R4. The first line of the table indicates that an address of a next hop router corresponding to a destination address "10.25.163.0/24" is "10.25.153.2" corresponding to the router R3, and that the packet is output from an actual IF#1.

After that, when the router (R1, R2, R3) receives a frame including user data from a subnetwork (S1, S2, S3) and a link (L1, L2, L3) under the router, the receiving process unit 24 checks a protocol value of the Outer IP header of the frame. When the protocol value is "254", the receiving process unit 24 decapsulates the frame by removing the Ether header and the Outer IP header to pass the decapsulated packet to the relay process unit 32 of the logical router 22B. When the IP address is not for the own router, the relay process unit 32 refers to the routing table 33 of the logical router 22B to determine an output actual IF and pass the IP packet to the sending process unit 23. When the protocol value is other than "254", only the Ether header is removed so that the packet is passed to the relay process unit 32 of the logical router 22A.

When the sending process unit 23 receives a packet from the relay process unit 32 of the logical router 22B, the sending process unit 23 refers to the protocol assignment table 28 to add an Outer IP header and an Ether header to the packet. In this case, "254" is selected as the protocol value of the Outer IP header, and a destination IP address (daddr) and a source IP address (saddr) the same as those of the Inner IP header are set. In addition, the sending process unit 23 sets a MAC address corresponding to the destination IP address as a destination MAC address, and sets a MAC address of a sending IF of the own router as a source MAC address. Then, the sending process unit 23 outputs the frame from an actual IF designated in the routing table 33. When the sending process unit 23 receives a packet from the relay process unit 32 of the logical router 22A, the sending process unit 23 refers to the protocol assignment table 28 to add only an Ether header to the packet and output the frame from an actual IF designated by the routing table 33.

In addition, when the protocol value of the Outer IP header is other than "254", the router passes the IP packet to the logical router 22A and processes the packet as a normal IP packet.

<Operation Switch Phase>

After the network manager confirms that the logical router 22B of each router operates as expected, the network manager switches a current logical router from the logical router 22A to the logical router 22B. The checking method of the configuration of the logical router 22B is similar to that in the first embodiment.

After confirming the operation of the logical router 22B, the network manager enters a switching command into the command receiving unit 26 in order to change the current logical router from the logical router 22A to the logical router 22B. The switching process unit 25 that receives the command from the command receiving unit 26 sends the protocol switching message shown in FIG. 50 to all of the other routers. The packet of the protocol switching message indicates to delete the logical router 22A from the protocol assignment table 28 and change the protocol value of the logical router 22B into "a value other than 254" at 2006/05/31 24:00.

When the switching process unit 25 of each router receives the protocol switching message, the switching process unit 25 updates the protocol assignment table 28 at 2006/05/31 24:00 designated by Action Time. In the updated protocol assignment table 28 in the routers R1-R3, a protocol value "other than 254" corresponding to the logical router 22B is set.

As mentioned above, according to embodiments of the present invention, a relay apparatus for performing relay possessing on a packet received from a network to send the packet to the network is provided, the relay apparatus includes:

a first logical relay unit configured to perform relay processing based on a first routing table;

a second logical relay unit configured to perform relay processing based on a second routing table;

a protocol assignment unit configured to register a first protocol identifier corresponding to the first logical relay unit and a second protocol identifier corresponding to the second logical relay unit;

a sending unit configured to add a packet header including the first protocol identifier or the second protocol identifier to a packet to be sent by the first logical relay unit or the second logical relay unit, and to send the packet to which the packet header is added to the network;

a receiving unit configured to pass a received packet to the first logical relay unit or the second logical relay unit by referring to the protocol assignment unit based on a protocol identifier in a packet header of the received packet; and a switching process unit configured to change correspondence relationship for the first and the second protocol identifiers to switch between the first relay processing and the second logical relay processing. By the way, the terms packet and frame may be used interchangeably in the specification and claims.

In the relay apparatus, each of the first and the second logical relay units may include a logical routing control unit configured to exchange routing information with another relay apparatus connected to the network to set the routing information into the first or the second routing table.

Also in the relay apparatus, each of the first and the second logical relay unit may include a unit configured to receive a test packet, generate a response packet for the test packet and send the response packet to a source of the test packet.

The relay apparatus may further include a switching message generation unit configured to generate, based on a command input, a switching message and send it to another relay apparatus connected to the network instructing a switching process unit of the another relay apparatus to perform switching.

The sending unit may add a packet header of a data link layer including the first protocol identifier to a packet to be sent by the first logical relay unit, and add a packet header of a data link layer including the second protocol identifier to a packet to be sent by the second logical relay unit, and the receiving process unit may pass a received packet to the first logical relay unit when a protocol identifier included in a packet header of the received packet is the first protocol identifier, and pass the received packet to the second logical relay unit when a protocol identifier included in a packet header of the received packet is the second protocol identifier.

In the relay apparatus, the sending unit may encapsulate a packet to be sent by the second logical relay unit with an encapsulation header in which the second protocol identifier is set, and the receiving unit may decapsulate a received packet when the received packet is encapsulated with the encapsulation header in which the second protocol identifier is set to pass the decapsulated received packet to the second logical relay unit.

Also, the sending unit may set the first or the second protocol identifier as a protocol type value in the packet header of the data link layer. In addition, the sending unit may set the second protocol identifier as a protocol value in the encapsulation header.

According to embodiments of the present invention, a network system configured by connecting a plurality of relay apparatuses in a network is provided, in which each relay apparatus includes:

a first logical relay unit configured to perform relay processing based on a first routing table;

a second logical relay unit configured to perform relay processing based on a second routing table;

a protocol assignment unit configured to register a first protocol identifier corresponding to the first logical relay unit and a second protocol identifier corresponding to the second logical relay unit;

a sending unit configured to add a packet header including the first protocol identifier or the second protocol identifier to a packet to be sent by the first logical relay unit or the second logical relay unit, and to send the packet to which the identifier is added to the network;

a receiving unit configured to pass a received packet to the first logical relay unit or the second logical relay unit by referring to the protocol assignment unit using a protocol identifier in a packet header of the received packet; and a switching process unit configured to change correspondence relationship for the first and the second protocol identifiers to switch between the first logical relay unit and the second logical relay unit.

In addition, according to embodiments of the present invention, a network configuration method for a network system configured by connecting a plurality of relay apparatuses in a network is provided. The method includes steps, performed by at least one of the relay apparatuses, of:

registering a first protocol identifier corresponding to first relay processing and a second protocol identifier corresponding to second relay processing;

adding a packet header including the first protocol identifier to a packet to be sent by performing the first relay processing based on a first routing table and sending the packet to which the first protocol identifier is added to the network, or adding a packet header including the second protocol identifier to a packet to be sent by performing the second relay processing based on a second routing table and sending the packet to which the second protocol identifier is added to the network, performing relay processing on a received packet based on the first routing table or the second routing table according to a protocol identifier in a packet header of the received packet; and changing correspondence relationship for the first and the second protocol identifiers to switch between the first logical relay processing and the second logical relay processing.

The present invention is not limited to the specifically disclosed embodiments, and variations and modifications may be made without departing from the scope of the present invention.

The present application contains subject matter related to Japanese patent application No. 2006-301983, filed in the JPO on Nov. 7, 2006, the entire contents of which are incorporated herein by reference.

What is claimed is:

1. A network configuring method for a network system configured by connecting a plurality of relay apparatuses in a network, comprising steps, performed by at least one of the relay apparatuses, of:

registering a first protocol identifier corresponding to first relay processing and a second protocol identifier corresponding to second relay processing;

adding a packet header including the first protocol identifier to a packet to be sent by performing the first relay processing based on a first routing table and sending the packet to which the first protocol identifier is added to the network, or adding a packet header including the second protocol identifier to a packet to be sent by performing the second relay processing based on a second routing table and sending the packet to which the second protocol identifier is added to the network;

performing relay processing on a received packet based on the first routing table or the second routing table according to a protocol identifier in a packet header of the received packet; and changing correspondence relationship for the first and the second protocol identifiers to perform switching between the first relay processing and the second relay processing, wherein in a state in which a first correspondence between the first protocol identifier and the first relay processing and a second correspondence between the second protocol identifier and the second relay processing are registered, the step of changing correspondence relationship deletes the first correspondence and replaces the second protocol identifier of the second correspondence with the first protocol identifier.

2. The network configuring method as claimed in claim 1, wherein each of the relay apparatuses exchange route information with another relay apparatus connected to the network to set the route information into the first or second routing table.

3. The network configuring method as claimed in claim 1, wherein, in each of the first and second relay processing, the relay apparatus receives a test packet, generates a response packet for the test packet and sends the response packet to a source of the test packet.

4. The network configuring method as claimed in claim 1, wherein the relay apparatus generates, based on input of a command, a switching message instructing the switching process unit of another relay apparatus to perform switching, and sends the switching message to the another relay apparatus connected to the network.

* * * * *